(12) United States Patent
Das et al.

(10) Patent No.: US 11,201,832 B2
(45) Date of Patent: *Dec. 14, 2021

(54) DYNAMIC ALLOCATION OF RESOURCES WHILE CONSIDERING RESOURCE RESERVATIONS

(71) Applicant: Microsoft Technology Licensing, LLC, Redmond, WA (US)

(72) Inventors: Sudipto Das, Redmond, WA (US); Vivek Narasayya, Redmond, WA (US); Feng Li, Kent Ridge (SG); Manoj Syamala, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,070

(22) Filed: Jun. 25, 2020

(65) Prior Publication Data

US 2020/0403930 A1 Dec. 24, 2020

Related U.S. Application Data

(63) Continuation of application No. 16/107,722, filed on Aug. 21, 2018, now Pat. No. 10,749,814, which is a continuation of application No. 15/435,269, filed on Feb. 16, 2017, now Pat. No. 10,063,491, which is a continuation of application No. 14/270,966, filed on May 6, 2014, now Pat. No. 9,602,426.

(Continued)

(51) Int. Cl.
*H04L 12/911* (2013.01)
*H04L 29/08* (2006.01)

(52) U.S. Cl.
CPC ............. *H04L 47/72* (2013.01); *H04L 67/10* (2013.01)

(58) Field of Classification Search
CPC .......... H04L 47/72; H04L 47/821–829; H04L 67/10; G06F 16/217; G06F 11/3442; G06F 11/3452; G06Q 20/145
See application file for complete search history.

(56) References Cited

U.S. PATENT DOCUMENTS 5,838,968 A 11/1998 Culbert
6,353,844 B1 * 3/2002 Bitar .................... G06F 9/4887
718/102

(Continued)

FOREIGN PATENT DOCUMENTS

CN 102857363 A 1/2013
CN 103383655 A 11/2013

(Continued)

OTHER PUBLICATIONS

"Preliminary Amendment for U.S. Appl. No. 16/107,722", filed Dec. 26, 2018, 6 Pages.

(Continued)

*Primary Examiner* — Alina A Boutah
(74) *Attorney, Agent, or Firm* — Medley, Behrens & Lewis, LLC

(57) ABSTRACT

Described herein are technologies relating to computing resource allocation among multiple tenants. Each tenant may have a respective absolute reservation for rate-based computing resources, which is independent of computing resource reservations of other tenants. The multiple tenants vie for the rate-based computing resources, and tasks are scheduled based upon which tenants submit the tasks and the resource reservations of such tenants.

20 Claims, 7 Drawing Sheets

Related U.S. Application Data

(60) Provisional application No. 61/838,201, filed on Jun. 21, 2013.

(56) References Cited

U.S. PATENT DOCUMENTS

| | | | |
|---|---|---|---|
| 7,016,375 B1* | 3/2006 | Rosenberg | H04L 47/72 370/468 |
| 7,028,158 B1 | 4/2006 | Beatty et al. | |
| 7,136,800 B1 | 11/2006 | Vega | |
| 7,370,013 B1* | 5/2008 | Aziz | G06F 9/5072 705/40 |
| 8,136,114 B1* | 3/2012 | Gailloux | G06Q 10/06 718/104 |
| 8,386,540 B1 | 2/2013 | McAlister et al. | |
| 8,589,549 B1 | 11/2013 | Vermeulen et al. | |
| 8,782,654 B2 | 7/2014 | Jackson | |
| 8,972,579 B2 | 3/2015 | Iori et al. | |
| 9,027,028 B2* | 5/2015 | An | G06F 9/5005 718/104 |
| 9,052,831 B1 | 6/2015 | Stefani et al. | |
| 9,116,754 B2* | 8/2015 | Jung | G06F 9/5072 |
| 9,450,876 B1 | 9/2016 | Marr | |
| 9,477,710 B2 | 10/2016 | Narasayya et al. | |
| 9,602,426 B2 | 3/2017 | Das et al. | |
| 10,063,491 B2* | 8/2018 | Das | H04L 47/72 |
| 10,410,155 B2 | 9/2019 | Das et al. | |
| 10,749,814 B2 | 8/2020 | Das et al. | |
| 2002/0107026 A1 | 8/2002 | Agrawal et al. | |
| 2003/0046396 A1 | 3/2003 | Richter et al. | |
| 2004/0030777 A1* | 2/2004 | Reedy | H04L 67/16 709/224 |
| 2005/0172291 A1* | 8/2005 | Das | G06F 9/5083 718/104 |
| 2007/0162584 A1* | 7/2007 | Kokusho | G06F 9/5083 709/223 |
| 2007/0226449 A1 | 9/2007 | Akimoto | |
| 2007/0266388 A1* | 11/2007 | Jackson | H04L 41/50 718/104 |
| 2008/0045272 A1* | 2/2008 | Wang | H04L 5/0007 455/561 |
| 2008/0052719 A1 | 2/2008 | Briscoe et al. | |
| 2008/0059972 A1* | 3/2008 | Ding | H04L 47/823 718/105 |
| 2008/0225889 A1 | 9/2008 | Truong et al. | |
| 2008/0316938 A1* | 12/2008 | Shi | H04L 47/14 370/252 |
| 2009/0012930 A1* | 1/2009 | Jackson | G06F 9/5027 |
| 2009/0099905 A1* | 4/2009 | McDonald | G06Q 10/06 705/7.25 |
| 2009/0182605 A1 | 7/2009 | Lappas et al. | |
| 2009/0185212 A1* | 7/2009 | Gustafson | G06Q 10/06 358/1.15 |
| 2009/0254433 A1* | 10/2009 | Cao | G06Q 30/0246 705/14.45 |
| 2009/0327781 A1 | 12/2009 | Tripathi | |
| 2010/0017506 A1 | 1/2010 | Fadell | |
| 2010/0083248 A1 | 4/2010 | Wood et al. | |
| 2010/0153960 A1* | 6/2010 | Youn | G06Q 10/103 718/104 |
| 2010/0220683 A1 | 9/2010 | Novak et al. | |
| 2010/0257544 A1 | 10/2010 | Kleban | |
| 2010/0306776 A1* | 12/2010 | Greene | G06Q 10/10 718/101 |
| 2010/0313203 A1* | 12/2010 | Dawson | G06F 1/3203 718/102 |
| 2011/0075596 A1 | 3/2011 | Moreira et al. | |
| 2011/0119312 A1 | 5/2011 | Chopra et al. | |
| 2011/0126168 A1 | 5/2011 | Ilyayev | |
| 2011/0225017 A1 | 9/2011 | Radhakrishnan | |
| 2011/0264805 A1 | 10/2011 | Breitgand et al. | |
| 2011/0292792 A1 | 12/2011 | Zuo et al. | |
| 2011/0296019 A1* | 12/2011 | Ferris | G06F 9/45533 709/226 |
| 2012/0066020 A1 | 3/2012 | Moon et al. | |
| 2012/0096165 A1* | 4/2012 | Madduri | H04L 41/5009 709/226 |
| 2012/0117242 A1 | 5/2012 | Aoki et al. | |
| 2012/0131591 A1 | 5/2012 | Moorthi et al. | |
| 2012/0230238 A1 | 9/2012 | Dalsgaard et al. | |
| 2012/0246319 A1 | 9/2012 | Um et al. | |
| 2012/0330954 A1 | 12/2012 | Sivasubramanian et al. | |
| 2013/0003538 A1 | 1/2013 | Greenberg et al. | |
| 2013/0006648 A1* | 1/2013 | O'Sullivan | H04L 41/5041 705/1.1 |
| 2013/0007753 A1 | 1/2013 | Jain | |
| 2013/0042253 A1* | 2/2013 | Yagi | G06F 9/50 718/104 |
| 2013/0060933 A1 | 3/2013 | Tung et al. | |
| 2013/0080617 A1 | 3/2013 | Driesen et al. | |
| 2013/0086270 A1 | 4/2013 | Nishikawa et al. | |
| 2013/0086273 A1 | 4/2013 | Wray et al. | |
| 2013/0124807 A1 | 5/2013 | Nielsen et al. | |
| 2013/0132057 A1 | 5/2013 | Deng et al. | |
| 2013/0139172 A1 | 5/2013 | An et al. | |
| 2013/0179289 A1* | 7/2013 | Calder | G06Q 30/0645 705/26.3 |
| 2013/0179476 A1 | 7/2013 | Saam et al. | |
| 2013/0179895 A1 | 7/2013 | Calder et al. | |
| 2013/0254384 A1 | 9/2013 | Wray | |
| 2013/0268914 A1 | 10/2013 | Oslake et al. | |
| 2013/0297655 A1* | 11/2013 | Narasayya | G06F 11/3457 707/791 |
| 2014/0007097 A1* | 1/2014 | Chin | G06F 9/5077 718/1 |
| 2014/0047106 A1* | 2/2014 | Leung | H04L 41/5012 709/224 |
| 2014/0068611 A1 | 3/2014 | Mcgrath et al. | |
| 2014/0074641 A1 | 3/2014 | Wang | |
| 2014/0115163 A1 | 4/2014 | Matousek | |
| 2014/0136295 A1 | 5/2014 | Wasser | |
| 2014/0149986 A1* | 5/2014 | S M | H04L 41/5003 718/1 |
| 2014/0207740 A1* | 7/2014 | Narasayya | G06F 11/3409 707/688 |
| 2014/0215487 A1 | 7/2014 | Cherkasova et al. | |
| 2014/0229221 A1* | 8/2014 | Shih | G06F 9/5038 705/7.23 |
| 2014/0244563 A1* | 8/2014 | Atomori | G06N 5/02 706/46 |
| 2014/0280948 A1 | 9/2014 | Schmidt et al. | |
| 2014/0280956 A1 | 9/2014 | Shu et al. | |
| 2014/0280961 A1 | 9/2014 | Martinez et al. | |
| 2014/0282503 A1* | 9/2014 | Gmach | G06F 9/45558 718/1 |
| 2014/0324647 A1 | 10/2014 | Iyoob et al. | |
| 2014/0379924 A1 | 12/2014 | Das et al. | |
| 2015/0046279 A1* | 2/2015 | Wang | G06F 3/0482 705/26.3 |
| 2015/0149501 A1* | 5/2015 | Prakash | G06F 9/5027 707/769 |
| 2015/0156135 A1 | 6/2015 | Brandwine et al. | |
| 2015/0281111 A1 | 10/2015 | Carl | |
| 2016/0019265 A1 | 1/2016 | Subramanian et al. | |
| 2016/0103717 A1 | 4/2016 | Dettori et al. | |
| 2016/0321588 A1 | 11/2016 | Das et al. | |
| 2017/0163554 A1 | 6/2017 | Das et al. | |
| 2018/0285766 A1* | 10/2018 | Shen | H04L 67/12 |
| 2019/0089647 A1 | 3/2019 | Das et al. | |
| 2019/0325370 A1 | 10/2019 | Das et al. | |

FOREIGN PATENT DOCUMENTS

| | | |
|---|---|---|
| CN | 103477323 A | 12/2013 |
| WO | 2014206266 A1 | 12/2014 |

OTHER PUBLICATIONS

"Amazon CloudWatch", Retrieved from:<<http://docs.aws.amazon.com/AmazonCloudWatch/latest/DeveloperGuide/acw-dg.pdf>>, 2018, 368 Pages.

(56) References Cited

OTHER PUBLICATIONS

"Auto Scaling", Retrieved from:<<https://web.archive.org/web/20150204025146/http://aws.amazon.com/autoscaling/>>, Retrieved on: Feb. 4, 2015, 3 Pages.

"Autoscaling Groups of Instances", Retrieved from:<<http://web.archive.org/web/20160406103155/https:/cloud.google.com/compute/docs/autoscaler/>>, Retrieved on: Feb. 10, 2015, 7 Pages.

Gunarathne, Thilina, "Introduction To Amazon Web Services", Retrieved from:<<http://salsahpc.indiana.edu/ICPAD/slides/Amazon_Web_Services_final.pdf>>, Retrieved on: Jul. 26, 2018, 47 Pages.

"Postgres Plus Cloud Database", Retrieved from:<<http://get.enterprisedb.com/docs/Postgres_Plus_Cloud_Database_Getting_Started_Guide_20140121.pdf>>, Jan. 6, 2014, 99 Pages.

"VMware Delivers A Modern Approach to Data Management High-Speed Data, Elastic Scale and Database-As-A-Service Capabilities for the Cloud Era", Retrievedfrom:<<https://web.archive.org/web/20130201125804/http://www.vmware.com/files/pdf/vFabric_Solutions_brief.pdf>>, Retrieved on: Feb. 1, 2013, 6 Pages.

"Final Office Action Issued in U.S. Appl. No. 14/702,644", dated Dec. 3, 2018, 18 Pages.

"Final Office Action Issued in U.S. Appl. No. 14/702,644", dated Feb. 14, 2018, 19 Pages.

"Non Final Office Action Issued in U.S. Appl. No. 14/702,644", dated Jul. 31, 2018, 17 Pages.

"Non-Final Office Action Issued in U.S. Appl. No. 14/702,644", dated Aug. 8, 2017, 19 Pages.

"Non-Final Office Action Issued in U.S. Appl. No. 15/435,269", dated Sep. 21, 2017, 23 Pages.

Ahmad, et al., "Predicting Completion Times of Batch Query Workloads Using Interaction-Aware Models and Simulation", In Proceedings of 14th International Conference on Extending Database Technology, Mar. 21, 2011, pp. 449-460.

Akdere, et al., "Learning-Based Query Performance Modeling and Prediction", In Proceedings of the IEEE 28th International Conference on Data Engineering, Apr. 1, 2012, 12 Pages.

Barker, et al., "ShuttleDB: Database-Aware Elasticity in the Cloud", In Proceedings of 11th International Conference on Autonomic Computing, Jun. 18, 2014, 11 Pages.

Curino, et al., "Relational Cloud: A Database-as-a-Service for the Cloud", In Proceedings of 5th Biennial Conference on Innovative Data Systems Research, Jan. 18, 2011, pp. 235-241.

Das, et al., "ElasTraS: An Elastic, Scalable, and Self-Managing Transactional Database for the Cloud", In Journal of ACM Transactions on Database Systems, vol. 38, Issue 1, Apr. 1, 2013, 45 Pages.

Didona, et al., "Transactional Auto Scaler: Elastic Scaling of In-Memory Transactional Data Grids", In Proceedings of 9th ACM International Conference on Autonomic Computing, Sep. 18, 2012, 10 Pages.

Duggan, et al., "Performance Prediction for Concurrent Database Workloads", In Proceedings of the ACM SIGMOD International Conference on Management of Data, Jun. 12, 2011, pp. 337-348.

Elmore, et al., "Characterizing Tenant Behavior for Placement and Crisis Mitigation in Multitenant DBMSs", In Proceedings of the ACM SIGMOD International Conference on Management of Data, Jun. 22, 2013, 12 Pages.

Ganapathi, et al., "Predicting Multiple Metrics for Queries: Better Decisions Enabled by Machine Learning", In Proceedings of IEEE 25th International Conference on Data Engineering, Mar. 29, 2009, 12 Pages.

Gandhi, et al., "AutoScale: Dynamic, Robust Capacity Management for Multi-Tier Data Centers", In Journal of ACM Transactions on Computer Systems (TOCS), vol. 30, Issue 4, Nov. 1, 2012, 26 Pages.

Gong, et al., "PRESS: PRedictive Elastic ReSource Scaling for Cloud Systems", In Proceedings of International Conference on Network and Service Management, Oct. 25, 2010, pp. 9-16.

Henri, Theil, "A Rank-Invariant Method of Linear and Polynomial Regression Analysis", In Proceedings of Koninklijke Nederlandse Akademie van Wetenschappen, vol. 53, Issue 9, 1950, 18 Pages.

Huber, et al., "Model-based Self-Adaptive Resource Allocation in Virtualized Environments", In Proceedings of 6th International Symposium on Software Engineering for Adaptive and Self-Managing Systems, May 23, 2011, pp. 90-99.

Li, et al., "Robust Estimation of Resource Consumption for SQL Queries Using Statistical Techniques", In Proceedings of the VLDB Endowment, vol. 5, Issue 11, Jul. 1, 2012, 12 Pages.

Lim, et al., "Automated Control for Elastic Storage", In Proceedings of the 7th International Conference on Autonomic Computing, Jun. 7, 2010, 10 Pages.

Mozafari, et al., "Performance and Resource Modeling in Highly-Concurrent OLTP Workloads", In Proceedings of the ACM SIGMOD International Conference on Management of Data, Jun. 22, 2013, 12 Pages.

Nguyen, et al., "AGILE: Elastic Distributed Resource Scaling for Infrastructure-as-a-Service", In Proceedings of 10th International Conference on Autonomic Computing, vol. 13, Jun. 26, 2013, pp. 69-82.

Padala, et al., "Automated Control of Multiple Virtualized Resources", In Proceedings of 4th ACM European Conference on Computer Systems, Apr. 1, 2009, 14 Pages.

Rousseeuw, et al., "Robust Regression and Outlier Detection", In Publication of John Wiley and Sons, Inc., 1987, 347 Pages.

Roy, et al., "Efficient Autoscaling in the Cloud Using Predictive Models for Workload Forecasting", In Proceedings of IEEE 4th International Conference on Cloud Computing, Jul. 4, 2011, 8 Pages.

Sakr, et al., "Is Your Cloud-Hosted Database Truly Elastic?", In Proceedings of IEEE Ninth World Congress on Services, Jun. 1, 2013, 4 Pages.

Shen, et al., "CloudScale: Elastic Resource Scaling for Multi-Tenant Cloud Systems", In Proceedings of the 2nd ACM Symposium on Cloud Computing, Oct. 27, 2011, 14 Pages.

Azbayar, et al., "Automated and On-Demand Provisioning of Virtual Machines for Database Applications", In Proceedings of ACM SIGMOD International Conference on Management of Data, Jun. 11, 2007, 3 Pages.

Soror, et al., "Automatic Virtual Machine Configuration for Database Workloads", In Proceedings of the ACM SIGMOD International Conference on Management of Data, Jun. 9, 2008, pp. 953-966.

Spearman, Charles, "The Proof and Measurement of Association Between Two Things", In American Journal of Psychology, vol. 15, Issue 1, Jan. 1, 1904, 31 Pages.

Storm, et al., "Adaptive Self-Tuning Memory in DB2", In Proceedings of the 32nd International Conference on Very Large Data Bases, Sep. 1, 2006, pp. 1081-1092.

Tanenbaum, et al., "Computer Networks", Retrieved from:<<http://iips.icci.edu.iq/images/exam/Computer-Networks---A-Tanenbaum-5th-edition.pdf>>, Sep. 27, 2010, 962 Pages.

Trushkowsky, et al., "The SCADS Director: Scaling a Distributed Storage System Under Stringent Performance Requirements", In Proceedings of 9th USENIX Conference on File and Storage Technologies, Feb. 15, 2011, 14 Pages.

Waldspurger, Carl A., "Memory Resource Management in VMware ESX Server", In Proceedings of the 5th USENIX Symposium on Operating Systems Design and Implementation, Dec. 31, 2002, pp. 181-194.

Zhao, et al., "An Architecture Framework for Application-Managed Scaling of Cloud-Hosted Relational Databases", In Proceedings of WICSA/ECSA Companion Volume, Aug. 20, 2012, 8 Pages.

"An Oracle White Paper: Delivering Database as a Service (DBaaS) Using Oracle Enterprise Manager 12c", Retrieved from:<<http://web.archive.org/web/20150319064703/http://www.oracle.com/technetwork/oem/cloud-mgmt/dbaas-overview-wp-1915651.pdf>>, Oct. 2013, 21 Pages.

"AWS: Amazon DynamoDB FAQs", Retrieved from:<<http://web.archive.org/web/20150407205632/https://aws.amazon.com/dynamodb/faqs/>>. Retrieved on: Apr. 7, 2015, 33 Pages.

Arredondo, J. R., "Rackspace Cloud Databases and Container-based Virtualization", Retrieved from:<<http://c1776742.cdn.cloudfiles.rackspacecloud.com/downloads/pdfs/Rackspace-Cloud-Databases-and-Container-based-Virtualization.pdf>>, Aug. 2012, 6 Pages.

(56) References Cited

OTHER PUBLICATIONS

"International Search Report and Written Opinion Issued in PCT Application No. PCT/US2016/026289", dated Jul. 13, 2016, 12 Pages.
Mao, et al., "Cloud Auto-scaling with Deadline and Budget Constraints", In Proceedings of 11th IEEE/ACM International Conference on Grid Computing, Oct. 25, 2010, pp. 41-48.
"Notice of Allowance Issued in U.S. Appl. No. 14/702,644", dated Mar. 26, 2019, 16 Pages.
"Non-Final Office Action for U.S. Appl. No. 16/107,722", dated Dec. 9, 2019, 12 Pages.
"Non-Final Office Action Issued in U.S. Appl. No. 16/502,018", dated Dec. 10, 2019, 21 Pages.
"Final Office Action Issued in U.S. Appl. No. 16/502,018", dated Jan. 14, 2021, 19 Pages.
"Response to the Non-Final Office Action for U.S. Appl. No. 16/107,722", filed Mar. 9, 2020, 7 Pages.
"Notice of Allowance and Fees Due for U.S. Appl. No. 16/107,722", dated Apr. 7, 2020, 7 Pages.
"Final Office Action Issued in U.S. Appl. No. 16/502,018", dated May 26, 2020, 22 Pages.
"Corrected Notice of Allowability for U.S. Appl. No. 16/107,722", dated Jul. 15, 2020, 2 Pages.
"The CPU Scheduler in VMware vSphere® 5.1", In Technical Whitepaper of VMware, Jan. 24, 2013, 26 pages.
Mozafar, et al., "Resource and Performance Prediction for Building a Next Generation Database Cloud", Retrieved on: May 15, 2013, Retrieved at: http://db.csail.mit.edu/pubs/cidr-rel-cloud.pdf, 4 pages.
McNeil, Scott, "Schema as a Service for Extreme Consolidation", Published on: Mar. 8, 2013, Retrieved at: https://blogs.oracle.com/oem/entry/schema_as_a_service_for, 3 pages.
"Multi-Tenancy and Database as a Service (DBaaS) with ScaleArc iDB", Published on: Jan. 2013, Retrieved at: http://www.scalearc.com/wordpress/wp-content/uploads/2013/01/ScaleArc_iDB_Whitepaper_Multi_Tenancy_And_DBaaS.pdf, 7 pages.
Elmore, et al., "Towards an Elastic and Autonomic Multitenant Database", In 6th International Workshop on Networking Meets Databases, Jun. 12, 2011, 6 pages.
Surtani, Manik, "Data-as-a-Service: The Data Fabric for Clouds", Published on: May 19, 2010, Retrieved at: http://java.dzone.com/articles/data-service-data-fabric, 3 pages.
Chandra, et al., "Surplus Fair Scheduling: A Proportional-Share CPU Scheduling Algorithm for Symmetric Multiprocessors", In Proceedings of the 4th Conference on Symposium on Operating System Design & Implementation, vol. 4, Oct. 23, 2000, 15 pages.
Goyal, et al., "A Hierarchical CPU Scheduler for Multimedia Operating Systems", In Proceedings of the Second USENIX Symposium on Operating Systems Design and Implementation, Oct. 28, 1996, 15 pages.
Jones, et al., "CPU Reservations and Time Constraints: Efficient, Predictable Scheduling of Independent Activities", In Proceedings of the Sixteenth ACM Symposium on Operating Systems Principles, Oct. 5, 1997, 14 pages.
Liu, et al., "Scheduling Algorithms for Multiprogramming in a Hard-Real-Time Environment", In Journal of the Association for Computing Machinery, vol. 20, Issue 1, Jan. 1973, 16 pages.
Mercer, et al., "Processor Capacity Reserves: Operating System Support for Multimedia Applications", In Proceedings of the International Conference on Multimedia Computing and Systems, May 15, 1994, 10 pages.
Narasayya, et al., "SQLVM: Performance Isolation in Multi-Tenant Relational Database-as-a-Service", In Proceedings of the 6th Biennial Conference on Innovative Data Systems Research, Jan. 6, 2013, 9 pages.
Nieh, et al., "The Design, Implementation and Evaluation of SMART: A Scheduler for Multimedia Applications", In Proceedings of the Sixteenth ACM Symposium on Operating System Principles, Oct. 5, 1997, 14 pages.

Shreedhar, et al., "Efficient Fair Queuing Using Deficit Round-Robin", In IEEE/ACM Transactions on Networking, vol. 4, Issue 3, Jun. 1996, 11 pages.
Steere, et al., "A Feedback-Driven Proportion Allocator for Real-Rate Scheduling", In Proceedings of the Third USENIX Symposium on Operating Systems Design and Implementation, Feb. 22, 1999, 15 pages.
Stoica, et al., "A Proportional Share Resource Allocation Algorithm for Real-Time, Time-Shared Systems", In 17th IEEE Real-Time Systems Symposium, Dec. 4, 1996, 12 pages.
Waldspurger, C. A., "Lottery and Stride Scheduling: Flexible Proportional-Share Resource Management", In the Technical Report, Sep. 1995, 151 pages.
"Effective Resource Management Using Oracle Database Resource Manager", Iln an Oracle White Paper, Jun. 2011, 24 pages.
"Using Oracle Database Resource Manager", In an Oracle White Paper, Apr. 2010, 26 pages.
"VMware® vSphere™: The CPU Scheduler in VMware ESX® 4.1", In the Technical Whitepaper, Retrieved on: May 16, 2013, 22 pages.
Waldspurger, et al., "Lottery Scheduling: Flexible Proportional Share Resource Management", In Proceedings of the 1st USENIX Conference on Operating Systems Design and Implementation, Article, Nov. 14, 1994, 11 pages.
Duda, et al., "Borrowed Virtual Time (BVT) Scheduling: Supporting Latency-Sensitive Threads in a General-Purpose Scheduler", In 17th ACM Symposium on Operating Systems Principles, Dec. 12, 1999, 16 pages.
Curino, et al., "Workload-Aware Database Monitoring and Consolidation", In Proceedings of the ACM SIGMOD International Conference on Management of Data, Jun. 12, 2011, 12 pages.
"DB2 Version 9.1 for z/OS, Administration Guide: Chapter 8: Monitoring and Controlling DB2 and Its Connections", Published on: Feb. 2013, Retrieved at: http://publib.boulder.IBM.com/epubs/pdf/dsnagk1e.pdf, 84 pages.
Goiri, et al., "Resource-Level QoS Metric for CPU-Based Guarantees in Cloud Providers", In Proceedings of the 7th International Conference on Economics of Grids, Clouds, Systems and Services, Aug. 31, 2010, 14 pages.
Gupta, et al., "Enforcing Performance Isolation Across Virtual Machines in Xen", In Proceedings of the ACM/IFIP/USENIX International Conference on Middleware, Nov. 27, 2006, 20 pages.
Stoica, et al., "On the Duality between Resource Reservation and Proportional Share Resource Allocation", In Multimedia Computing and Networking, Feb. 1997, 8 pages.
Jain, et al., "A Quantitative Measure of Fairness and Discrimination for Resource Allocation in Shared Computer Systems", In DEC Research Report TR-301, Sep. 26, 1984, 38 pages.
Lang, et al., "Towards Multi-Tenant Performance SLOs", In Proceedings of the IEEE 28th International Conference on Data Engineering, Apr. 1, 2012, 12 pages.
Stonebraker, Michael, "Operating System Support for Database Management", In Magazine of Communications of the ACM, vol. 24, Issue 7, Jul. 1981, 7 pages.
Urgaonkar, et al., "Resource Overbooking and Application Profiling in Shared Hosting Platforms", In Journal of ACM Transactions on Internet Technology, vol. 9, Issue 1, Feb. 2009, 16 pages.
Xiong, et al., "Intelligent Management of Virtualized Resources for Database Systems in Cloud Environment", In Proceedings of the IEEE 27th International Conference on Data Engineering, Apr. 11, 2011, 12 pages.
"Office Action for U.S. Appl. No. 14/270,966", dated Apr. 8, 2016, 22 pages.
"Response to the Office Action for U.S. Appl. No. 14/270,966", filed Sep. 8, 2016, 23 pages.
"Notice of Allowance and Fees Due for U.S. Appl. No. 14/270,966", dated Nov. 9, 2016, 14 pages.
"Response to the Non-Final Office Action for U.S. Appl. No. 15/435,269", filed Feb. 21, 2018, 15 Pages.
"Notice of Allowance and Fees Due for U.S. Appl. No. 15/435,269", dated May 1, 2018, 11 Pages.
"Non Final Office Action Issued in U.S. Appl. No. 16/502,018", dated Oct. 2, 2020, 20 Pages.

(56) References Cited

OTHER PUBLICATIONS

"First Office Action and Search Report Issued in Chinese Patent Application No. 201680025422.1", dated Apr. 36, 2021, 9 Pages.
"Notice of Allowance Issued in U.S. Appl. No. 16/502,018", dated Apr. 28, 2021, 14 Pages.
Lloyd, W. J., "Autonomous Management of Cost, Performance, and Resource Uncertainty for Migration of Applications to Infrastructure-as-a-Service (IaaS) Clouds", In Dissertation of Partial Fulfillment of the Requirements for the Degree of Doctor of Philosophy, Colorado State University, Fort Collins, Colorado, 2014, 226 Pages.
"Office Action and Search Report Issued in European Patent Application No. 20212492.1", dated Mar. 4, 2021, 11 Pages.

* cited by examiner

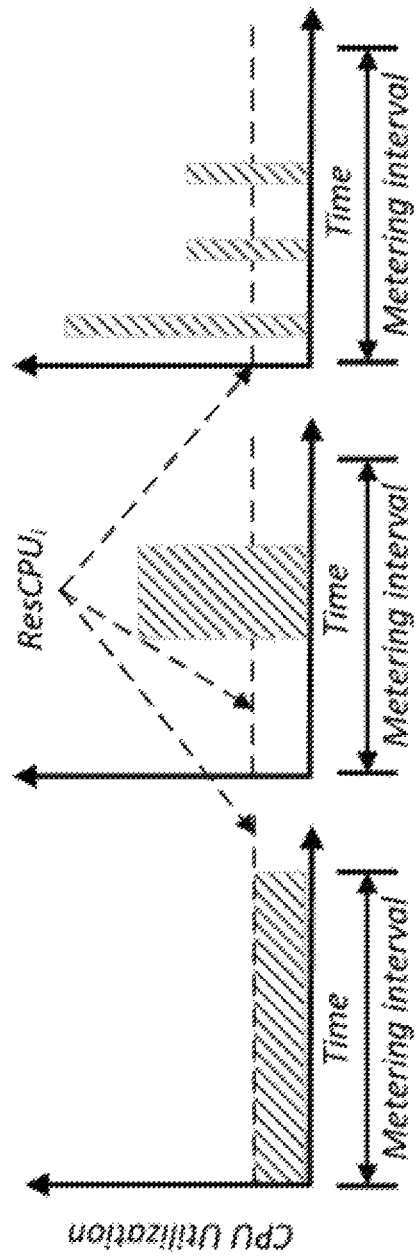
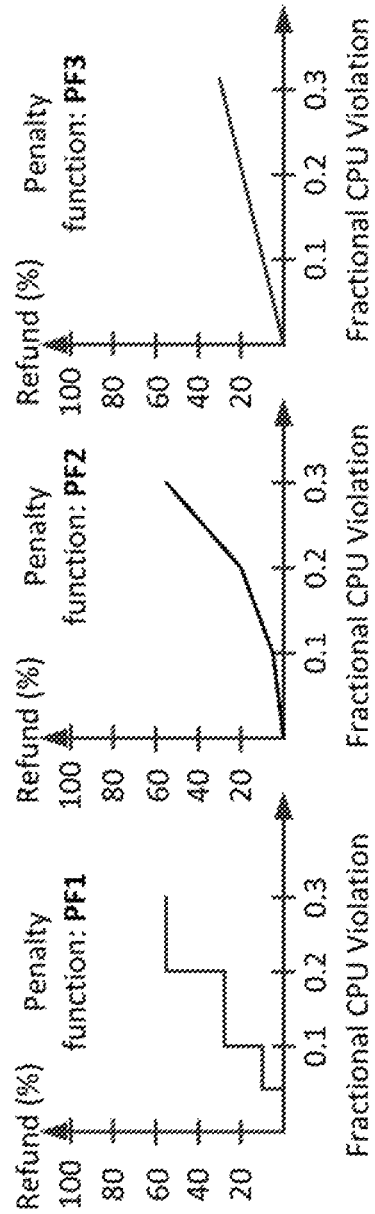
FIG. 4A  FIG. 4B  FIG. 4C
FIG. 5A  FIG. 5B  FIG. 5C

DYNAMIC ALLOCATION OF RESOURCES WHILE CONSIDERING RESOURCE RESERVATIONS

RELATED APPLICATIONS

This application is a continuation of U.S. patent application Ser. No. 16/107,722, filed on Aug. 21, 2018, and entitled "DYNAMIC ALLOCATION OF RESOURCES WHILE CONSIDERING RESOURCE RESERVATIONS", which is a continuation of U.S. patent application Ser. No. 15/435,269 filed on Feb. 16, 2017 and entitled "DYNAMIC ALLOCATION OF RESOURCES WHILE CONSIDERING RESOURCE RESERVATIONS", which is a continuation of U.S. patent application Ser. No. 14/270,966, filed on May 6, 2014, and entitled "DYNAMIC ALLOCATION OF RESOURCES WHILE CONSIDERING RESOURCE RESERVATIONS", which claims priority to U.S. Provisional Patent Application No. 61/838,201, filed on Jun. 21, 2013, and entitled "DYNAMIC ALLOCATION OF RESOURCES WHILE CONSIDERING RESOURCE RESERVATIONS". The entireties of these applications are incorporated herein by reference.

BACKGROUND

Computer-executable database management systems (DBMSs) have conventionally executed on respective dedicated enterprise servers. For example, a computer-executable application may be configured to output data (to a user that utilizes the application) based upon, for example, an identity of the user and input to the application provided by the user. The application can interface with a DBMS, which executes queries in connection with retrieving data of interest. Conventionally, the content provider (e.g., the application owner) purchased a dedicated server configured to execute the DBMS.

As network bandwidth has increased and latency has decreased, it has become desirable in many circumstances to offload certain computing tasks to a service oriented architecture (e.g., the cloud). Therefore, rather than the above-mentioned content provider having to purchase a dedicated server and license an instance of the DBMS to execute on such server, the content provider may contract with a cloud service that retains the data of the content provider remotely and executes the DBMS remotely. This is beneficial to the content provider, as the content provider need not incur the front-end cost of purchasing a server, maintaining and upgrading such server over time, installing updates for the DBMS, etc.

To provide a cost-effective solution to content providers (e.g., customers), however, the cloud service may configure server computing devices such that resources (e.g., CPU, memory, . . . ) of the server computing devices are shared among multiple tenants (customers). That is, for a particular server computing device owned and operated by the cloud service, two or more customers may share resources of such server computing device. Conventionally, resource sharing has been facilitated through static allocation of resources to customers; e.g., a customer is allocated the entirety of a core of a multicore server computing device. Such static allocation, however, may be associated with inefficient usage of the resources of the server computing device, as static allocation limits a number of tenants that can be consolidated on a server to a number of available cores (for example), resulting in higher costs to the customers. For instance, a customer may be allocated an entirety of a core of a multicore server device, even though the customer may typically utilize a fraction of the processing resources of the core.

SUMMARY

The following is a brief summary of subject matter that is described in greater detail herein. This summary is not intended to be limiting as to the scope of the claims.

Described herein are various technologies pertaining to dynamically allocating processing resources of server computing devices utilized in a cloud service to tenants of the server computing devices while taking into consideration resource reservations of the tenants. A "tenant", as the term is used herein, can refer to logically isolated computer-executable code (a logical entity) with application logic that is configured to submit requests to a service and receive responses to such requests. Each tenant in a multi-tenant cloud-based service can reserve a respective amount of rate-based computing resources of server computing device(s), and the cloud-based service can be configured to allocate rate-based computing resources across the multiple tenants to meet such reservations (e.g., based upon workloads of the tenants). Rate-based computing resources include CPU, disk I/O, network I/O, amongst others. In an exemplary embodiment, rate-based computing resources reserved for a tenant can be CPU time allocated to the tenant as a percentage of an elapsed time. Therefore, for example, if a tenant $T_1$ reserves 30% CPU utilization on a server computing device, the assurance is that if $T_1$ has sufficient demand for the CPU utilization, the cloud-based service is responsible to allocate 30% CPU over a predefined time interval to $T_1$, irrespective of which other tenants co-located on the server computing device are vying for the CPU.

Absolute assurances at the level of rate-based computing resources facilitates catering to a variety of workloads without making assumptions or imposing limitations. As will be described herein, rate-based computing resource reservations can be static or elastic, wherein a static reservation may be well-suited for resource-intensive tenants with steady resource demands, while an elastic reservation may be well-suited for tenants with intermittent, unpredictable, and bursty workloads. Briefly, a static reservation of rate-based computing resources for a tenant reserves a first threshold amount of rate-based computing resources for every (smallest) pre-defined time interval. Therefore, for instance, if tenant $T_1$ has a static reservation for 30% CPU, then $T_1$ is to be allocated (if $T_1$ has a sufficient workload) 30% CPU for every pre-defined time interval. In contrast, an elastic reservation provides flexibility for a tenant, in that the tenant can have a reservation for a second threshold amount of rate-based computing resources over a longer period of time (e.g., multiple time intervals), allowing for bursty demands of the tenant to be met without requiring the tenant to purchase rate-based computing resources for its peak resource demands.

Also described herein are technologies for accounting to tenants when their respective reservations are not met by the cloud service. As tenants may have bursty and relatively unpredictable workloads, to drive costs of the cloud service downwards to customers, the service may overbook rate-based computing resources of a server computing device. It can be ascertained, however, that utilization of rate-based computing resources lower than the reservation in an overbooked server does not necessarily indicate that a reservation of a tenant has not been met, since the tenant may not have sufficient demand for the rate-based computing resources. The metering technologies described herein can be configured to differentiate between cases where the tenant has insufficient demand (and thus does not use reserved resources) from cases where the tenant has sufficient demand but is deprived rate-based computing resources.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 4a-4c illustrate exemplary computing resource reservation curves.

FIGS. 5a-5c illustrate exemplary penalty functions that can be utilized to reimburse tenants whose reservations are not met.

DETAILED DESCRIPTION

Figure 1:
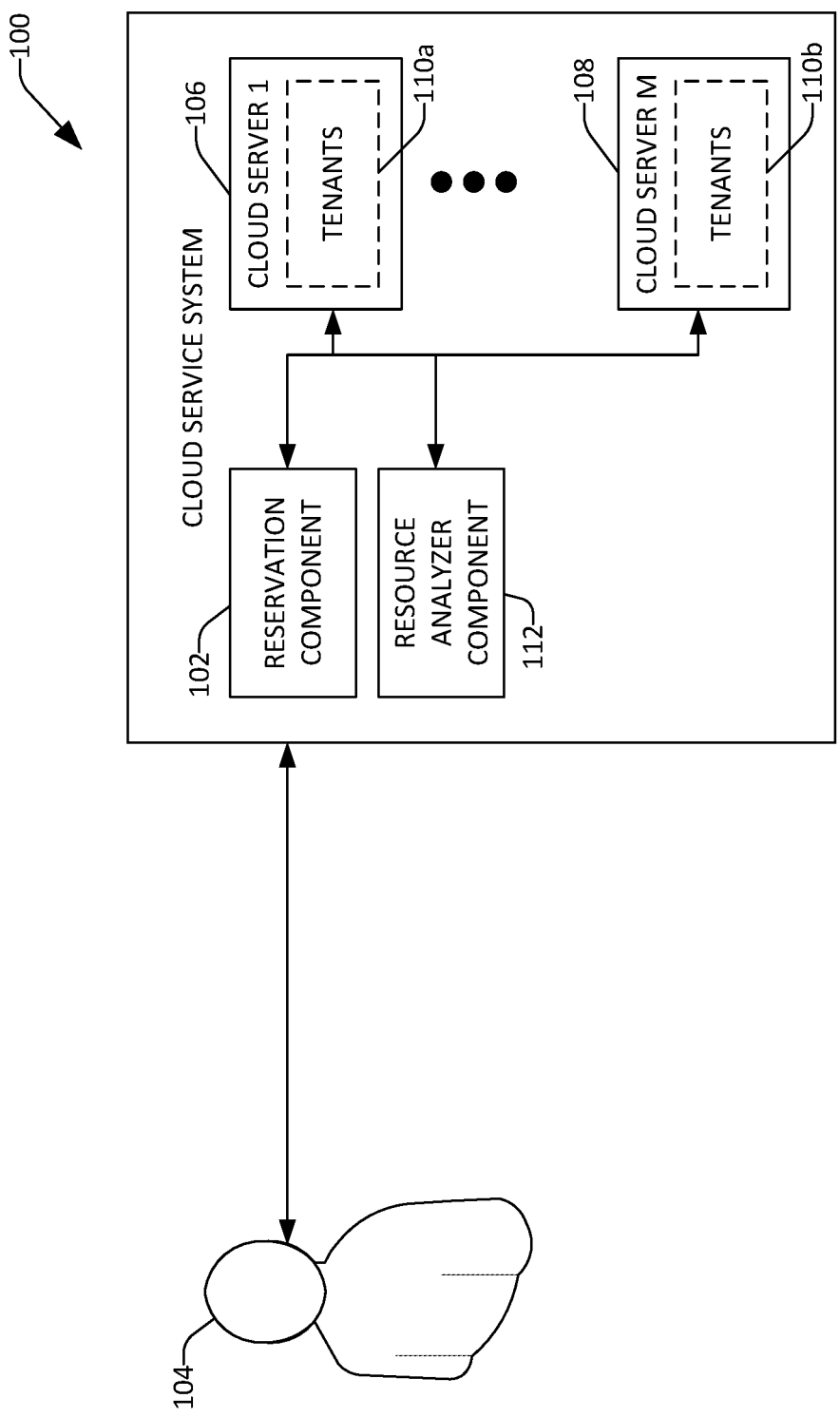
FIG. 1 is a functional block diagram of an exemplary service system that is configured to reserve rate-based computing resources for tenants in a multi-tenant server computing device.

Various technologies pertaining to scheduling workloads of tenants that have absolute computing resource reservations are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to scheduling workloads of tenants on a server computing device utilized in a cloud service, while taking into consideration rate-based computing resources on the server computing device reserved for such tenants (e.g., as defined in a service-level agreement (SLA)). Rate-based computing resources include CPU, network I/O, disk I/O, and the like. A "tenant", as the term is used herein, can refer to computer-executable code corresponding to a particular customer of the cloud service that is vying for resources of at least one core of a multi-core processor in a server computing device utilized to provide a service to the particular customer. In an exemplary embodiment, the server computing device can be configured with a database management system (DBMS) that executes database operations, such as queries, joins, etc. Therefore, the cloud service can be a Database as a Service (DaaS) system. As the rate-based resources of the computing device are shared among tenants, the tenants can be scheduled in accordance with absolute resource reservations for such tenants.

With reference now to FIG. 1, an exemplary cloud service system 100 that is configured to take into consideration absolute computing resource reservations promised to multiple tenants executing over multiple server computing devices is illustrated. The cloud service system 100 comprises a reservation component 102 that is configured to generate and maintain a list of tenants that use the cloud service system 100 and rate-based computing resources promised to such tenants. In an example, a customer 104 may wish to utilize services offered by the cloud service system 100 (e.g., may wish to have the cloud service system 100 maintain a database of the customer 104 and execute queries over the database). While the customer 104 is shown as being a person, it is to be understood that the customer 104 can be a business, an organization, a governmental body, etc. As can be understood, the cloud service system 100 acts in a transparent manner to the customer 104, in that, from the perspective of the customer 104, it is as if the service system 100 exists on the site of the customer 104 without the customer 104 having to concern themselves with maintaining the service offered by the cloud service system 100.

When utilizing with the cloud service system 100 (which may also be referred to herein as a "provider"), the customer 104 can specify absolute rate-based computing resources of the cloud service system 100 that are desirably reserved for the customer 104. With more specificity, the cloud service system 100 can comprise a plurality of cloud servers 106-108, each of which may include multiple tenants 110a-110b. For instance, the customer 104 can specify a desire to reserve a particular percentage of CPU associated with at least one cloud server in the cloud servers 106-108. Therefore, the customer 104 can enter into an agreement with the cloud service system 100, where the customer 104 is promised the reserved rate-based computing resources of the at least one cloud server from the cloud servers 106-108. In an exemplary embodiment, the reserved rate-based computing resources may be in the form of any of a percentage, number of virtual cores, CPU time, percentage of disk time, number of I/O operations per second, disk transfers per second, number of disk bytes transferred per second, etc. For instance, the customer 104 can indicate a desire to reserve a particular percentage of CPU of at least one server in the plurality of server cloud servers 106-108 (e.g., where the percentage is less than 100%). In another exemplary embodiment, the customer 104 can indicate a desire to reserve a particular number of processing cycles per unit of time of at least one server in the plurality of cloud servers 106-108. In yet another example, the customer 104 can indicate a desire to reserve a virtual processor core or several virtual processor cores.

A resource analyzer component 112 can analyze computing resource reservations of the tenants 110a-110b as well as computing capabilities of the cloud servers 106-108 (e.g., CPU, memory, . . . ), and the reservation component 102 can place a tenant (corresponding to the customer 104) at one or more of the cloud servers 106-108 based upon the existing computing resource reservations and the computing capabilities of the cloud servers 106-108. Further, the reservation component 102 can assign the tenant corresponding to the customer 104 to a particular core of a cloud server, a particular set of cores of a cloud server, or sets of cores across cloud servers. Thus, if the resource analyzer component 112 ascertains that the cloud server 106 is overbooked while the cloud server 108 is underbooked, the reservation component 102 can assign the tenant corresponding to the customer 104 to the cloud server 108.

In an example, a service level agreement (SLA) between the customer 104 and the cloud service system 100 may identify the rate-based computing resources reserved for the tenant corresponding to the customer 104, wherein such resources are promised to be available to the tenant so long as the tenant has a sufficient workload to utilize such resources. Thus, if the SLA between the customer 104 and the cloud service system 100 indicates that the customer 104 has reserved 10% of CPU of the first cloud server 106 for use by the tenant, and the tenant has runnable tasks that will utilize 10% of the CPU of the first cloud server 106, then such CPU resources are to be available to the tenant. The SLA can also indicate that the provider (e.g., the cloud service system 100) will pay a penalty if the cloud service system 100 does not meet the reservation of the tenant.

Still further, the SLA can indicate that the rate-based computing resources reservation for the tenant may be static in nature or dynamic in nature. A static reservation can indicate that the reserved rate-based computing resources (e.g., a first threshold amount of computing resources) are to be available to the tenant at each (smallest) metering interval (e.g., one minute metering interval). Static resource reservations may be particularly well-suited for customers who have relatively steady workloads to be performed at the cloud service system 100 by their respective tenants. In contrast, an elastic resource reservation can indicate that the reserved rate-based computing resources (e.g., a second threshold amount of computing resources) are to be available to the tenant over a combination of metering intervals, thereby providing flexibility to the tenant for bursty workloads. For example, the SLA may indicate that the tenant is to be reserved 10% of CPU of the first cloud server 106 over 20 metering intervals. If the tenant has an elastic resource allocation, the tenant may use 0% of the CPU for the first ten metering intervals, and therefore effectively have a reservation of 20% of the CPU for the last ten metering intervals (so long as a predefined allocation cap is not surpassed).

It can be ascertained that it may be desirable to overbook servers in the cloud-servers 106-108 (e.g., reserve more rate-based computing resources than what is available), as workloads of tenants are often time-varying. Therefore, in an example, it may be desirable for the reservation component 102 to reserve 150% of the CPU of the first cloud server 106, since it is highly unlikely that every tenant assigned to the cloud server 106 will simultaneously have workloads that utilize the entireties of their reservations. Technologies described in greater detail herein pertain to scheduling workloads of multiple tenants executing on at least one cloud server in the cloud service system 100 without statically allocating rate-based computing resources (e.g., without statically allocating a core of a multi-core processor to a particular tenant), while also taking into consideration the reservations of resources promised to the tenants 110a-110b.

Figure 2:
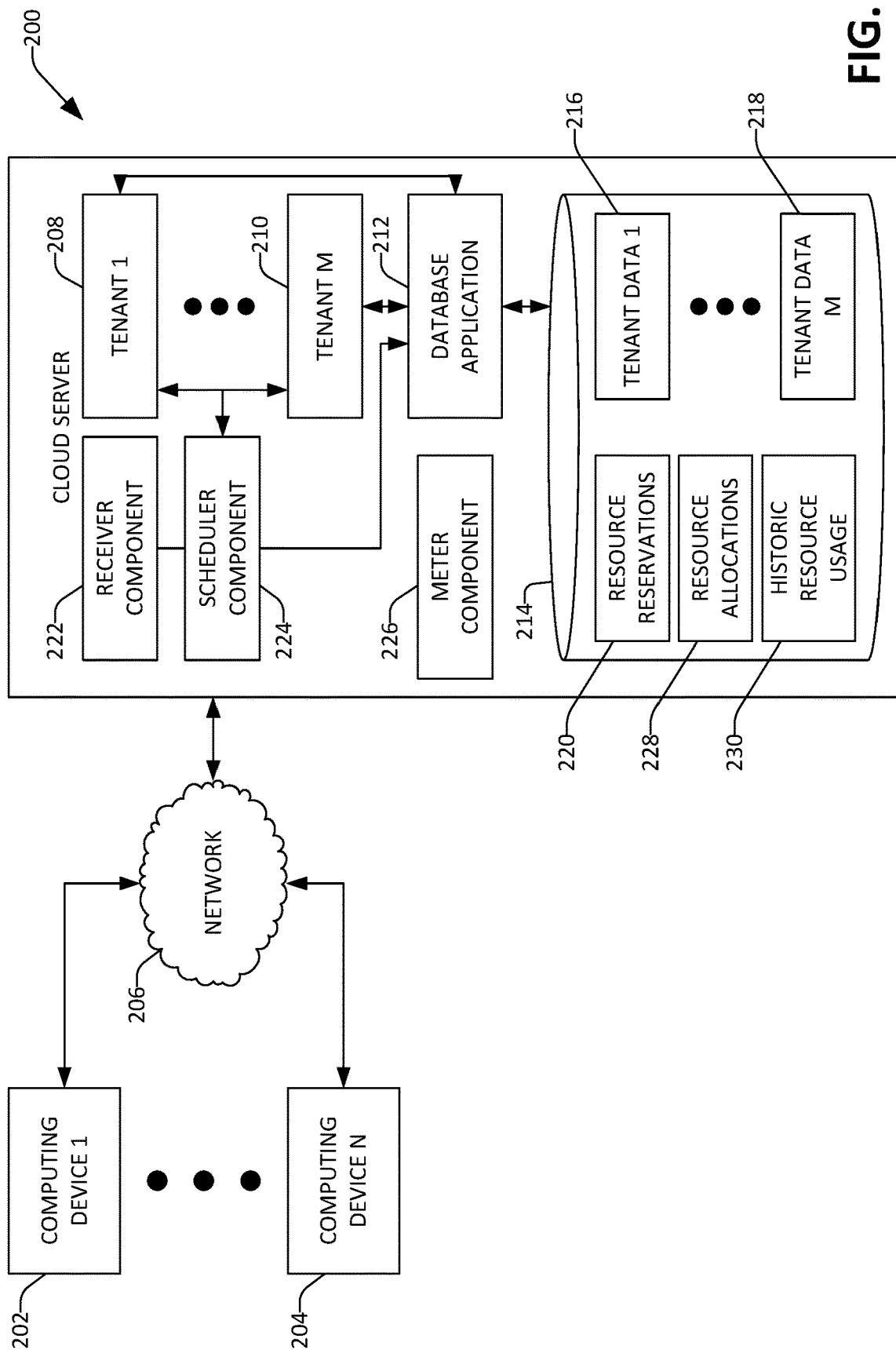
FIG. 2 is a functional block diagram of an exemplary system that facilitates scheduling workloads of multiple tenants while taking into consideration resource reservations for such tenants.

With reference now to FIG. 2, an exemplary cloud server 200 that is configured to dynamically allocate rate-based computing resources of the cloud server 200 to multiple tenants vying for the resources of the cloud server 200, while also taking into consideration absolute computing resource reservations promised to such tenants, is illustrated. In an exemplary embodiment, the cloud server 200 can be in communication with a plurality of computing devices 202-204 by way of a network 206, such as the Internet. The computing devices 202-204 may be operated by respective customers of the cloud service system 100, which can comprise the cloud server 200. In an example, the cloud server 200 is utilized in a DaaS system, where the computing devices 202-204 transmit data to the cloud server 200 by way of the network 206, and such data causes database operations to be executed.

In an exemplary embodiment, the cloud server 200 can support multiple tenants 208-210, each of which has a respective reservation for rate-based computing resources of the cloud server 200. The cloud server 200 can execute a database application 212 (e.g., a DBMS), wherein the tenants 208-210 request processes supported by the database application 212.

The cloud server 200 can also comprise or have access to a data repository 214, which can include respective isolated tenant data 216-218. Thus, for example, the first tenant data 216 can be a database of the first tenant 208 and the mth tenant data 218 can be a database for the mth tenant 210. The data repository 214 also comprises resource reservations 220 for the respective tenants 208-210. Such resource reservations 220 can be absolute, such that a resource reservation for the first tenant 208 is independent of a resource reservation of the mth tenant 210. Accordingly, the tenants 208-210 can reason about rate-based computing resources similar to the classic enterprise setting, where a tenant had its own server. It is further to be understood that the resource reservations 220 are not restrictive of workloads that may be requested by the respective tenants 208-210 (e.g., the resource reservations may not be resource caps). Further, the resource reservations 220 may include a variety of different types of reservations. For instance, a first tenant can be a performance-sensitive line of business application with continuous resource demands, and thus a customer of the cloud service system 100 that manages the tenant may benefit from guaranteed resource assurances and may be willing to subscribe to a premium service. In contrast, other tenants may be associated with relatively brief periods of activity, and customers that respectively correspond to the tenants may therefore benefit from an economy service with minimal resource assurances. Further, as indicated above, the resource reservations 220 may include, for at least one tenant in the plurality of tenants 208-210, an elastic reservation, which can adapt to changing workload requirements of the at least one tenant. Further, the resource reservations 220 may including notions of accountability, wherein if resources promised in the resource reservations 220 are for some reason unavailable to a respective tenant, then the provider can provide an accounting for the unavailability, such as a refund to the tenant whose resource reservations were unmet.

The cloud server 200 comprises a receiver component 222 that receives data (e.g., requests) from the computing devices 202-204 by way of the network 206. The receiver component 222 can provide such data to the tenants 208-210, which may then contend for rate-based computing resources of the cloud server 200. That is, the tenants 208-210 can generate tasks to be performed by the cloud server 200 based upon data received from the computing devices 202-204. A scheduler component 224 is in communication with the tenants 208-210 and receives tasks from the tenants 208-210 that are to be performed by the cloud server 200. Generally, the scheduler component 224 is configured to schedule tasks received from the respective tenants 208-210 while taking into consideration the resource reservations 220 of the tenants 208-210. As will be described in greater detail herein, the scheduler component 224 can execute a greedy heuristic in connection with scheduling tasks of the respective tenants 208-210.

The scheduler component 224 can schedule tasks of the tenants 208-210 based upon various information. For instance, the scheduler component 224 can identify when the cloud server 200 is overbooked, where tasks requested to be performed by the cloud server 200 from one or more tenants cause at least one tenant to fail to be provided with its reserved rate-based computing resources. Thereafter, the scheduler component 224 can schedule tasks based upon a cost to the provider for failing to meet reservations of at least one tenant in the tenants 208-210. Additionally, the scheduler component 224 can schedule tasks based upon a measure of fairness (e.g., to avoid entirely starving a tenant from resources that is has reserved).

The cloud server 200 can further include a meter component 226 that can meter the resource usage of the tenants 208-210 relative to their respective resource reservations 220. With more particularity, the data repository 214 may also include resource allocations 228 for the respective tenants 208-210 over metering intervals, wherein the meter component 226 is configured to identify situations where a promise of resources to a tenant has been violated due to overbooking on the cloud server 200. A metering interval can be some pre-defined amount of time over which resource usage is analyzed (e.g., one minute, 5 minutes, 10 minutes, etc.). The data repository 214 may also include historic resource usage 230, which can be employed by the scheduler component 224 and the meter component 226 when scheduling workloads of respective tenants 208-210 and accounting to tenants when guaranteed resources for a tenant are unavailable due to overbooking.

Additional detail pertaining to actions of the scheduler component 224 and the meter component 226 are now provided. In an exemplary embodiment, the resource reservations 220 can be CPU reservations for the tenants 208-210. A CPU reservation is a promise that a tenant ($T_i$) will be allocated a minimum CPU time ($ResCPU_i$) on the cloud server 200 if $T_i$ has sufficient work to use the CPU time irrespective of which other tenants are contending for CPU at the cloud server 200. CPU time can be expressed as utilization. CPU utilization of $T_i$($CPU_i$) over an interval of time, which can be referred to as a metering interval, can be defined as time for which tasks of $T_i$ use the $CPU_i$ expressed as a percentage of the total time in the interval. CPU reservations isolate resources of $T_i$, such that the workload of $T_i$ is not affected by reservations of other tenants. Therefore, if $T_i$ is promised a 10% CPU reservation at the cloud server 200, and the metering interval is set to one second, it implies that in a given one second period $T_i$ will be allocated 10% of the aggregated CPU time across all processor cores on the cloud server 200. Therefore, $T_i$ is promised a slice of the CPU time at the cloud server 200, which can be finer than a processor core. Such fine-grained sharing allows more tenants to be consolidated on the cloud server 200 than available cores on such server 200. Further, the resource reservations 220 remain supported.

Further, in an exemplary embodiment, CPU reservations can be for a physical server or a logical server. As indicated in FIG. 1, the cloud service system 100 can have a heterogeneous cluster of servers 106-108. In such a setting, the resource reservation exposed to a tenant can be abstracted from that of the capacity of the cloud server 200 that is hosting the tenant. Thus, for instance, the first tenant 208 can be promised a reservation on a logical server. Once the first tenant 208 is placed on the cloud server 200, its logical CPU reservation can be mapped to the reservation on the cloud server 200 based upon the capacity of the cloud server 200.

In addition to providing a tenant $T_i$ with the minimum CPU utilization $ResCPU_i$, the cloud service system 100 may also limit the maximum CPU utilization of $T_i$($MaxCPU_i$), where $MaCPU_i \geq ResCPU_i$. It can be ascertained that the goal of the scheduler 224 is to meet ResCPU for all tenants on the cloud server 200. Thus, the CPU utilization of $T_i$ can only be higher than $ResCPU_i$ (up to $MaxCPU_i$), provided surplus CPU capacity is available at the cloud server 200 after meeting ResCPU for all active tenants $T_j$ on the cloud server 200. The value of $MaxCPU_i$ may be a policy decision; however, the scheduler component 224 can enforce this limit even if the tenant $T_i$ inundates the cloud server 200 with a large amount of work.

Further, as noted above, the resource reservations 220 do not imply static resource allocation. Thus, it is possible that the provider can allocate less CPU to a tenant than what is indicated in the resource reservations 220, particularly when resources of the cloud server 200 are overbooked. The meter component 226 acts to establish accountability when the CPU utilization of a tenant is less than its reservation indicated in the resource reservations 220. To perform this task, the meter component 226 can differentiate between 1) low utilization of resources due to insufficient work from the tenant; and 2) low utilization of resources due to the cloud server 200 being overbooked, where demand of the resources by the tenants 208-210 exceeds the capacity. It can be ascertained that, oftentimes, one or more of the tenants 208-210 may be idle. Therefore, overbooking of the rate-based computing resources of the cloud server 200 does not necessarily imply a violation of one or more of the resource reservations 220.

Therefore, the meter component 226 can be configured to factor out an idle time of the tenant $T_i$ (e.g., when $T_i$ did not have CPU work, and hence, was not allocated the CPU allotted to it in the resource reservations 220). If the scheduler component 224 ascertains that $T_i$ has at least one task that is either allocated CPU of the cloud server 200 or is ready to utilize CPU of the cloud server 200, then $T_i$ has work that can utilize the CPU. The provider can violate a resource reservation of $T_i$ by delaying the CPU allocation of $T_i$ (e.g., by allocating the CPU to another tenant, even though $T_i$ had at least one task ready to use the CPU). The meter component 226 can compute the percentage of time that $T_i$ was delayed ($Delay_i$). The meter component 226 can independently track $Delay_i$ for tenant $T_i$, and aggregate such delay at the end of a specified interval.

The effective CPU utilization of $T_i$ can be defined as follows:

$$CPU_i^{\textit{Eff}} = \frac{CPU_i \times 100}{(CPU_i + Delay_i)} \quad (1)$$

where the resource reservation for $T_i$ is violated if and only if $CPU_i^{\textit{Eff}} < ResCPU_i$. For example, if $ResCPU_1$ of $T_1$ is 10%, and in a particular metering interval CPU was 5% and $Delay_1$ was 40%, then the resource allocation to $T_1$ was not violated in the metering interval ($CPU_1^{\textit{Eff}} > ResCPU_1$). If, however, in another metering interval $Delay_1$ was 50% with everything else remaining unchanged, the resource guarantee for $T_i$ was violated ($CPU_1^{\textit{Eff}} < ResCPU_1$). Such definition of metering does not hold the provider accountable for the tenant being idle while ensuring that the cloud server 200 cannot arbitrarily delay a task of a tenant without violating its reservation. Further, it is to be understood that the metering performed by the meter component 226 can be independent of acts of the scheduler component 224. Accordingly, the metering performed by the meter component 226 can establish trust between the provider and the customer, which often may have conflicting and independent interests. The meter component 226 can perform metering at pre-specified metering interval boundaries.

The CPU reservation abstraction noted above exposes a static resource reservation suitable for tenants with a steady resource demand. It is contemplated, however, that the cloud service system 100 may serve tenants with a variety of workload types. Therefore, a static reservation may be unattractive for tenants with unpredictable and bursty workloads. Subscribing to a large static reservation equal to the peak demand may be uneconomical, and a small static reservation equal to the average utilization limits the ability of a tenant to obtain resources during workload bursts. To make reservations economical for lightweight tenants, the reservation component 102 can consolidate hundreds or even thousands of tenants on the cloud server 200. This implies that each tenant will be provided a relatively small reservation. Strictly limiting a tenant's utilization curve to its reservation may not be desirable for bursty workloads, as it prevents tenants from getting quick access to resources, resulting in high end-to-end query latencies. FIG. 4A illustrates a static utilization curve. Tenants with workload bursts benefit from elastic reservations, where utilization curves similar to those shown in FIGS. 4B and 4C are supported.

Elastic reservations bound the total area under the utilization curve for a given metering interval, while the shape of the curve can be driven by the resource demands of the tenant and bounded by a maximum burst size. Therefore, a tenant may subscribe to a small reservation (such as 0.5%) for a long metering interval (e.g., minutes or hours). The magnitude of the reservation depends upon its average resource utilization over long periods. The scheduler component 224 can take into consideration a burst parameter $b_i$ when scheduling workloads of tenants, and can be configured to provide a tenant with an elastic resource reservation quick access to resources when the workload of the tenant needs such resources. Metering performed by the meter component 226 for elastic reservations is similar to that of static reservations described above. Thus, if $T_i$ has an elastic resource reservation $ResCPU_i$ with a burst $b_i$, then when $T_i$ is active and its utilization is less than $ResCPU_i$ for the entire metering interval, the burst is not met if $CPU_1^{\textit{Eff}} < b_i$.

As the resource reservations 220 are exposed directly to the tenants 208-210, such resource reservations 220 are associated with a price that customers corresponding to the tenants 208-210 pay for the resources. Further, a resource reservation may have a penalty, where the provider refunds a fraction of the price paid by a tenant if a resource reservation for the tenant is violated. Resource reservations can be accompanied by penalty functions. For instance, a resource reservation of $T_i$ is violated if and only if $CPU_i^{\textit{Eff}} < ResCPU_i$. The extent of violation can be computed as a fractional CPU violation as follows:

$$ViolCPU_i = \frac{ResCPU_i - CPU_i^{\textit{Eff}}}{ResCPU_i} \quad (2)$$

The numerator is the absolute violation in the reservation and the denominator normalizes the violation, allowing this metric to be used for tenants with different $ResCPU_i$. Different penalty functions can be associated with $ViolCPU_i$. FIGS. 5a-5c illustrate a few representative penalty functions which use $ViolCPU_i$ to determine the percentage of price to be refunded to a tenant whose resource reservation has been violated. Irrespective of the function shape, the scheduler component 224 can be price-aware, which can allow the provider to increase revenue while decreasing penalties.

Also, as indicated above, the scheduler component 224 can take into consideration fairness when scheduling resources among the tenants 208-210. For instance, if the scheduler component 224 was solely concerned with minimizing penalty, certain low-priced service classes may be starved of computing resources (e.g., CPU), thus making the system relatively unfair in terms of CPU utilization. For instance, the provider may offer different levels of subscriptions (e.g., level 1, level2 or gold, silver and bronze). When the cloud server 200 is overbooked, higher-level tenants may deprive CPU to the lower level tenants (e.g., in order to minimize the penalties paid to the incurring violation for the higher priced higher level tenant). The scheduler component 224 can employ a suitable fairness index to prevent the above from occurring. For example, if the scheduler component 224 is configured to fairly allocate rate-based computing resources among the tenants 208-210, then $ViolCPU_i$ is the same for each of the tenants 208 through 210. An exemplary fairness index (e.g., Jain's fairness index) can be expressed as follows:

$$\mathcal{J}(ViolCPU_1, \ldots, ViolCPU_n) = \frac{\left(\sum_{i=1}^{n} ViolCPU_i\right)^2}{n \times \sum_{i=1}^{n} (ViolCPU_i)^2}. \quad (3)$$

The value of $\vartheta$ can vary between one (all tenants have equal value of $ViolCPU_i$) to $$\frac{1}{n}$$

(one tenant $T_i$ gets the largest possible $ViolCPU_i$, with $ViolCPU_j$ being zero for all other tenants $T_j$), where n is the number of tenants with at least one task active during a metering interval.

Figure 3:
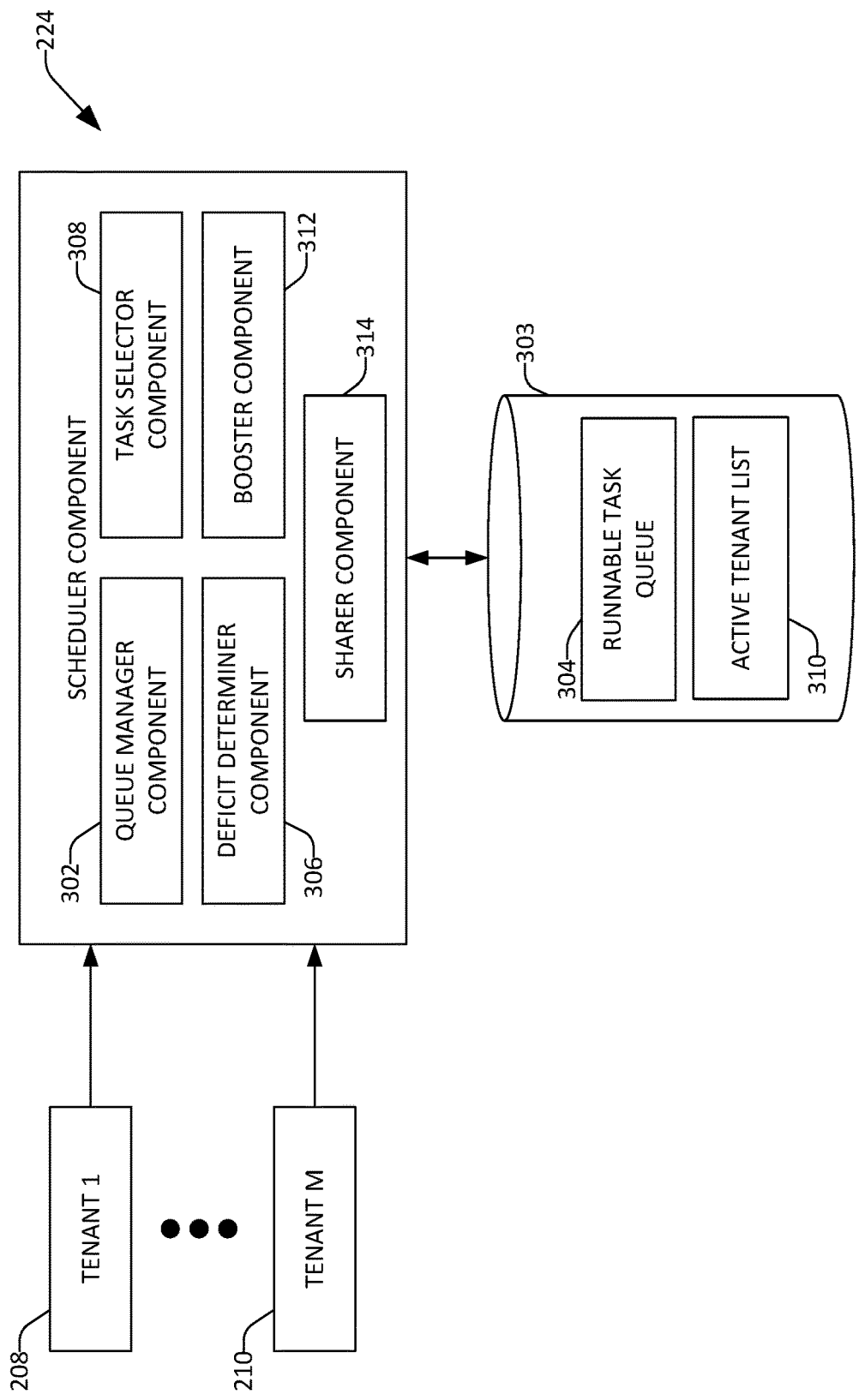
FIG. 3 is a functional block diagram of an exemplary scheduler component that schedules workloads of tenants in a multi-tenant server computing device.

With reference now to FIG. 3, the scheduler component 224 is shown in greater detail. As indicated above, the scheduler component 224 may be utilized in connection with a DBMS that is shared among multiple tenants. Many DBMSs directly manage resources of a server (such as CPU, memory and disk I/O) with minimal support from an operating system (OS) of the server upon which the DBMS is executing. For instance, a DBMS executing on a multicore processor can be considered, wherein a scheduler is run that enforces the specific scheduling policies of the DBMS. Specifically, DBMSs often use a user-mode cooperative scheduler that allows more control to the system designers in determining opportune moments for yielding the CPU. The scheduler component 224, however, need not be a non-preemptive scheduler. For instance, each core of a multicore processor of the cloud server 200 can have a respective scheduler component executing thereon, thereby allowing a DBMS to scale to multiple cores. Thus, the scheduler component 224 can be associated with a particular core of a processor of the cloud server 200, and each core can execute an instance of the scheduler component 224.

The scheduler component 224, on the core to which it has been assigned, can comprise a queue manager component 302. The queue manager component 302 can have access to a data store 303, and can manage a runnable task queue 304 for all tasks received from the tenants 208-210 that are deemed as being runnable. Specifically, a task can be in one of the following states: 1) running (currently executing on the core); 2) runnable (ready to execute, but waiting); or 3) blocked (waiting on some resource; e.g., a lock on a data item, and hence, not ready to execute). The queue manager component 302 maintains the runnable task queue 304 to include all runnable tasks from the tenants 208-210. At a context switch boundary, the scheduler component 224 can determine which tasks in the runnable task queue 304 are to be allocated resources (CPU). Every task allocated the CPU uses its quantum of CPU, which is a predefined maximum time set by the cooperative scheduler of the database application 212. By having at most as many scheduler components as the number of processor cores, and each scheduler component making at most one task runnable, the OS scheduler on the cloud server 200 can schedule only those tasks made runnable by the scheduler of the database application 212, thereby allowing the database application 212 to control the CPU without relying on the OS of the cloud server 206.

A primary goal of the scheduler component 224 is to meet the resource reservations 220 of the tenants 208-210. Accordingly, in an exemplary embodiment, the scheduler component 224 can be configured to ensure that each of the tenants 208-210 is provided opportunities to use the CPU which is in proportion to their respective $ResCPU_i$. In some embodiments, however, different tenants may have different quantum lengths. For instance, an online transaction processing (OLTP) workload may have a shorter quanta compared to an analysis workload. Varying numbers of connections and degrees of parallelism make this even more challenging.

Accordingly, the scheduler component 224 can receive feedback based upon utilization of CPU of the tenants 208-210 in view of their respective resource reservations 220. Specifically, the scheduler component 224 can receive feedback from a tenant $T_i$ that is indicative of the CPU utilization of $T_i$ ($CPU_i$) and the resource reservation of $T_i$ ($ResCPU_i$). The scheduler component 224 can include a deficit determiner component 306 that can compute a fractional deficit ($d_i$) for $T_i$ over a predefined interval, which measures the deficit between the utilization of CPU by $T_i$ and the resource reservation of $T_i$, normalized by the resource reservation:

$$d_i = 1 - \frac{CPU_i}{ResCPU_i} \quad (4)$$

$d_i$ is positive if $CPU_i < ResCPU_i$, thus signifying that $T_i$ is CPU deficient. The deficit determiner component 306 can compute $d_i$ at a context switch boundary to determine an amount of CPU deficiency corresponding to $T_i$, and the scheduler component 224 can make scheduling decisions accordingly. As noted above, $CPU_i$ can be computed as CPU allocated to $T_i$ from a start of a metering interval, expressed as a percentage of the time elapsed in the interval. $ResCPU_i$ can be received from the resource reservations 220.

The scheduler component 224 further comprises a task selector component 308 that selects a task to be executed based upon the fractional deficit computed by the deficit determiner component 306 for tenants having tasks in the runnable task queue 304.

The scheduler component 224, in an exemplary embodiment, can utilize a scheduling algorithm which does constant amount of work per context switch, and thus can scale to a relatively large number of concurrently active tenants. The task selector component 308 can utilize a variant of a round-robin scheduling algorithm where the scheduler component 224 uses the deficit for the scheduling decisions. To utilize such algorithm, the queue manager component 302 can maintain a list of active tenants 310, wherein a tenant is active if it has at least one task identified as runnable in the runnable task queue 304. Each entry in the active tenant list 308 may point to a FIFO queue of all runnable tasks of the tenant. For instance, the queue manager component 302 can maintain the runnable task queue 304 as a hash table keyed on tenant ID. For a tenant which has recently become active, a new entry can be added to the active tenant list 310 to the current element, allowing addition to the runnable task queue 304 to be a constant time operation.

The task selector component 308 can go round-robin over the active tenant list 310, and at every context switch boundary, can determine if the current tenant $T_i$ (e.g., a task of such tenant) is to be scheduled. If $d_i$ is greater than zero and $T_i$ has more CPU work, then the task selector component 308 can schedule $T_i$ for the next quantum. If $CPU_i < MaxCPU_i$, then the next tenant in the active tenant list 310 is examined. If $d_i \leq 0$ and $CPU_i\ MaxCPU_i$, then scheduling $T_i$ is a trade-off between minimizing the scheduling overhead versus delaying allocation of CPU to $T_j$ with $d_j > 0$. If $T_i$ is scheduled, it is possible that there is at least one other $T_j$ ($j \neq i$) in the active tenant list 310 with $d_j > 0$ which was deprived the CPU, thus potentially not meeting $ResCPU_j$. On the other hand, if $T_i$ is not scheduled, it amounts to wasted work for the scheduler component 224, thus increasing the scheduling overhead. If $T_i$ is not scheduled when $d_i \leq 0$, then in the worst-case, if $d_j \leq 0 \forall j \in [1, \ldots, n]$ scheduling cost tending towards O(n) results, where n is the number of active tenants.

In another exemplary embodiment, the task selector component 308 can utilize an algorithm that employs knowledge about active tenants in the active tenant list 310 to select a next tenant to be allocated CPU. The deficit determiner component 306 can compute fractional deficits of all tenants identified in the active tenant list 310, and the task selector component 308 can use a greedy heuristic to allocate CPU to the tenant with the largest deficit (e.g., which is most CPU deficient). This can be referred to as a largest deficit first (LDF) algorithm. In an exemplary embodiment, the scheduler component 224 can maintain a per tenant FIFO queue with a pointer to this queue maintained in a hash table keyed by the tenant ID. Looking up the queue of the tenant and appending to such queue may be a constant time operation. When selecting a task from the queue, the task selector component selects the tenant from among tenants in the active tenant list 310 with the largest deficit. To make task selection efficient, the deficit determiner component 306 can re-compute every tenant's fractional deficit at a context switch boundary and select the tenant with the largest deficit. Exemplary pseudo-code for the LDF algorithm is set forth below:

of progress toward the goal. By selecting the tenant which is farthest from the goal (e.g., with the largest deficit), the scheduler component 224 can ensure that the CPU bandwidth is proportionally shared in the ratio of all the active tenants' $ResCPU_i$. That is, if all tenants are active, $T_i$'s proportion is $$\frac{(ResCPU_i)}{\left(\sum_{j=1}^{n} ResCPU_j\right)}.$$

Additionally, the scheduler component 224 can be a dynamic priority scheduler that is work-conserving. That is, a scheduling priority of a tenant can be determined dynamically at every context switch and unless a limit is enforced by $MaxCPU_i$, the scheduler component 224 can operate at 100% CPU utilization if tenants have enough work to consume the resources of the cloud server 200.

The meter component 226 can track the amount of time a tenant was delayed over a metering interval (e.g., the tenant had at least one runnable task but the CPU was allocated to another tenant). The runnable tasks in the runnable task queue 304 can include respective timestamps, which can be updated when tenants transition from idle to active. Subsequently, when a tenant $T_i$ yields the CPU to another tenant

---

LDF algorithm:

```
while true do
    maxDeficit ← −∞; maxDeficitTenant ← NULL
    for each active tenant T_i do
        d_i = 1 − CPU_i/ResCPU_i
        if (CPU_i < MaxCPU_i && d_i > maxDeficit) then
            maxDeficit ← d_i; maxDeficitTenant ← T_i
    if (maxDeficit > −∞) then
            //Select the task at the head of the queue for the tenant with largest
            deficit
            ScheduleTask (maxDeficitTenantHead)
    else
            //Either no tenant is active or all tenants have hit their maximum limit
            ScheduleIdleQuantum ( )
```

---

Utilization of the above algorithm indicates that if the cloud server 200 has sufficient CPU capacity, all reservations can be met. Specifically, if CPU capacity is not overbooked and a tenant submits sufficient work, then the LDF algorithm ensures that every tenant will meet its reservation. Additionally, LDF results in continual sharing of the CPU in proportion to $ResCPU_i$, thereby preventing one tenant with a large reservation from consuming the CPU for long periods. When $T_i$ uses the CPU for a given quantum, the rate of decrease in $d_i$ is inversely proportional to Eq. (3). Contrarily, if $T_i$ was not allocated a quantum, the increase in its deficit is directly proportional to $ResCPU_i$. An exemplary scenario is set forth herein for purposes of explanation. Three tenants, $T_1$, $T_2$ and $T_3$ have resource reservations of $ResCPU_1$, $ResCPU_2$, and $ResCPU_3$. $ResCPU_1$ is 1.5 times $ResCPU_2$, which is twice that of $ResCPU_3$. The goal of the scheduler component 224 is to meet the reservation for each tenant. For the sake of simplicity, it can be assumed that quantum length of every tenant is equal (variability and quantum length is a feedback used to compute $d_i$). Allocating one quantum to $T_3$ takes it three times closer to the goal compared to $T_1$, and twice closer compared to $T_2$. In other words, in this example, $T_1$ requires three quanta, $T_2$ requires two, and $T_3$ requires one quantum to make the same amount $T_j$ the timestamp of $T_j$ is updated to the current time and the delay of $T_j$ is incremented by the difference between the current time and the previous value of the timestamp of $T_j$. Tasks of a given tenant can execute at multiple cores of a multi-core processor of the cloud server 200. Accordingly, the meter component 226 can accumulate delays of $T_i$ across all cores at the end of the metering interval to compute $CPU_i^{Eff}$, which is used to detect a violation in the reservation for such tenant.

Elasticity of resources is one factor that makes cloud services attractive to customers. The basic model of CPU reservations, however, exposes a static reservation. For instance, the fractional deficit metric computed by the deficit determiner component 306 allows elastic scaling of $ResCPU_i$. As indicated above, different shapes in the utilization curve (see FIGS. 4a-4c) can be achieved by internally boosting the reservation of a tenant (and thus, the priority of the tenant). The scheduler component 224 may include a booster component 312 that can perform such boosting. For instance, if the CPU utilization of $T_i$ in the metering interval is less than a fraction $f_i (0 \leq f_i \leq 1)$ of $ResCPU_i$ for the entire metering interval, then internally the booster component 312 can boost the reservation of $T_i$ to $b_i$, where $b_i$ is an input parameter to the scheduler component 224. The deficit determiner component 306 then uses the boosted reservation to compute $d_i$, which is in turn used by the task selector component 308 to determine the priority of $T_i$. As the booster component 312 is internal to the scheduler component 224, relatively low response times to bursty and mostly inactive tenant workloads can be provided. The actual reservation of the tenant remains unaffected and determines the total CPU allocated in the metering interval. The shape of the utilization curve depends on the workload of $T_i$ and resource demands.

Thus, the booster component 312 can execute a dynamic boosting algorithm, which introduces parameters $f_i$ and $b_i$. If $f_i$ is zero, the booster component 312 is disabled, and if $f_i$ is one, the tenant can benefit from boosting until it has exhausted its entire reservation. A value of 0.8 boosts priority until the utilization is up to 80% of the reservation, and beyond that a regular scheduling algorithm is used to schedule the tenant. Similarly, setting $b_i=MaxCPU_i$ allows the priority of the tenant to be boosted to the maximum CPU utilization allowed by the scheduler component 224 for $T_i$. The values used for $f_i$ and $b_i$ are policy decisions. It can also be noted that dynamic boosting may be temporary (e.g., only for a specific scheduling opportunity). If the scheduler component 224 allocated $T_i$ CPU, and CPU utilization of $T_i$ is above $f_i \times ResCPU_i$, then the scheduling priority of $T_i$ drops back to normal.

While the description above has been focused on meeting CPU reservations, it can be understood that the provider may desirably enforce one or more policies based on price, penalties, and/or to optimize for revenue and fairness in an overbooked server. The LDF algorithm set forth above can be adapted to cater to such additional requirements by changing the formula used by the deficit determiner component 306 to compute $d_i$. The remainder of the scheduling logic can remain unaltered.

The scheduler component 224 can further include a sharer component 314 that is configured to share surplus CPU capacity (e.g., remaining CPU after the resource reservations 220 have been met). The sharer component 224 can share this capacity in the ratio of $ResCPU_i$ of all active tenants in the active tenant list 310. In a more general setting, the provider may wish to share the CPU in the proportion of a weight ($w_I$) associated with $T_i$. $w_i$ can correspond to the price paid by the tenant, $ResCPU_i$, or some other provider-determined weight. Once the CPU utilization of $T_i$ has reached $ResCPU_i$, sharing in proportion of $w_i$ can be achieved by computing $d_i$ as follows:

$$d_i = \frac{(ResCPU_i - CPU_i)}{w_i} \quad (5)$$

It can be noted that $d_i<0$, since $CPU_i<ResCPU_i$. Accordingly, any tenant with a positive deficit continues to have higher priority and the scheduler component 224 ensures that all reservations are met first. Additionally, the modified formula for $d_i$ proportionally shares the surplus CPU in the ratio of $$\frac{w_i}{\sum_k w_k}$$

for all active tenants $T_k$ that have met their respective reservations.

Further, the scheduler component 224 may be configured to maximize revenue of the provider. When reservations are exposed to tenants, the provider may associate a price and a penalty function. In such a setting, if the cloud server 200 is overbooked and there is more demand for CPU than resources available, some resource reservations may be violated. When reservations have associated prices and penalties, violations may decrease the revenue of the provider. Accordingly, it is natural for the provider to want to maximize its revenue. Since the basic LDF algorithm, noted above, is unaware of prices and penalties and does not optimize for revenue, it can result in considerable penalties in an overbooked server. The scheduler component 224 can be configured to minimize penalty (and maximize revenue) by allocating the CPU to the tenant with the highest potential penalty if deprived the CPU. This greedy heuristic can also be added to the LDF algorithm by modifying the deficit computation as follows:

$$d_i = PF_i(ViolCPU_i) \times price_i, \quad (6)$$

where $price_i$ is the price paid by $T_i$ for the reservation, $ViolCPU_i$ is a fractional violation of $T_i$'s reservation, and $PF_i$ is a penalty function used to obtain the fractional penalty expected for this metering interval, assuming that $T_i$ continues to receive the same CPU proportion when multiplied by the $price_i$ paid by $T_i$. $d_i$ is the absolute penalty for which the provider is liable to $T_i$. Thus, the LDF algorithm, when executed by the task selector component 308, will result in the selection of the tenant with the largest potential for penalty. Note that for $CPU_i \geq ResCPU_i$, penalty is zero and so is $d_i$. Eqs. (4) or (5) can be used for setting the value of $d_i$, which in this case will be negative.

In yet another exemplary embodiment, the scheduler component 224 can be configured to take into account fairness when allocating resources to the tenants 208-210. For instance, the above-mentioned greedy heuristic can result in some tenants being deprived CPU more than others, thus, making the system seem unfair in terms of utilization fairness. Fairness may be important to prevent a tenant from being completely starved of resources and/or considerable performance degradation. Fairness may also be important for customer satisfaction and retention in a competitive marketplace. When using the deficit formula from Eq. (4), the LDF algorithm is utilization fair, while using Eq. (6) makes it completely revenue oriented. The deficit determiner component 306 can trade-off fairness and revenue by combining both factors into the deficit computation as follows:

$$d_i = \alpha \times \left(1 - \frac{CPU_i}{ResCPU_i}\right) + (1-\alpha) \times \left(\frac{PF_i(ViolCPU_i) \times price_i}{Max(price_i)}\right) \quad (7)$$

The first component controls utilization fairness, while the second component maximizes revenue. To match with utilization fairness which is normalized, the revenue component can be normalized by dividing price, with the maximum price among all tenants. The parameter $\alpha$ is the fairness index, which determines how the fairness of the scheduler component 224: $\alpha=0$ configures the scheduler component 224 to maximize for revenue, and $\alpha=1$ configures the scheduler component 224 to be fair. It can be noted that $\alpha$ does not directly correspond to any fairness measure. The closer $\alpha$ is to one, the higher the fairness of the scheduler component 224.

Exemplary pseudo-code corresponding to a dequeue operation of the LDF scheduler extended to consider revenue and fairness is set forth below:

---
Dequeue Operation of Scheduler Component
---
```
while true do
    maxDeficit ← −∞; maxDeficitTenant ← NULL
    for each active tenant T_i do
        reservation ← ResCPU_i; schedOpt ← GetSchedulerOption ( )
        if (schedOpt = BOOSTED & IsElasticRes (T_i) &
        CPU_i < f_i × ResCPU_i)
        then
            reservation ← b_i
        d_i ← 1 − CPU_i/reservation
        if (CPU_i > ResCPU_i) then
            //Proportionally sharing the surplus CPU capacity
            d_i ← (ResCPU_i − CPU_i)/w_i
        else if ((shedOpt = MAXIMIZE_REVENUE)) then
            d_i ← PF_i (ViolCPU_i) × price_i
        else if (schedOpt = REVENUE_AND_FAIRNESS) then
```

$$d_i \leftarrow \alpha \times \left(1 - \frac{CPU_i}{ResCPU_i}\right) + (1 - \alpha) \times \left(\frac{PF_i(ViolCPU_i) \times price_i}{\text{Max}(price_i)}\right)$$

```
        if (CPU_i < MaxCPU_i && d_i > maxDeficit) then
            maxDeficit ← d_i; maxDeficitTenant ← T_i
        //Schedule tenant with largest deficit
```

In an exemplary embodiment, the cloud server 200 can be a virtualized server, in that each tenant executes in a respective virtual machine (VM), and the scheduler component 224 is executed in a hypervisor (HV). In another exemplary embodiment, as indicated above, the tenants can be logically isolated while not executing in respective VMs. Further, while the description set forth above pertains to database operations, it can be recognized that the scheduler component 224 and aspects associated therewith can be employed in other settings. For example, the scheduler component 224 can be utilized in Software as a Service (SaaS) settings, in Infrastructure as a Service (IaaS) settings, among others.

Figure 6:
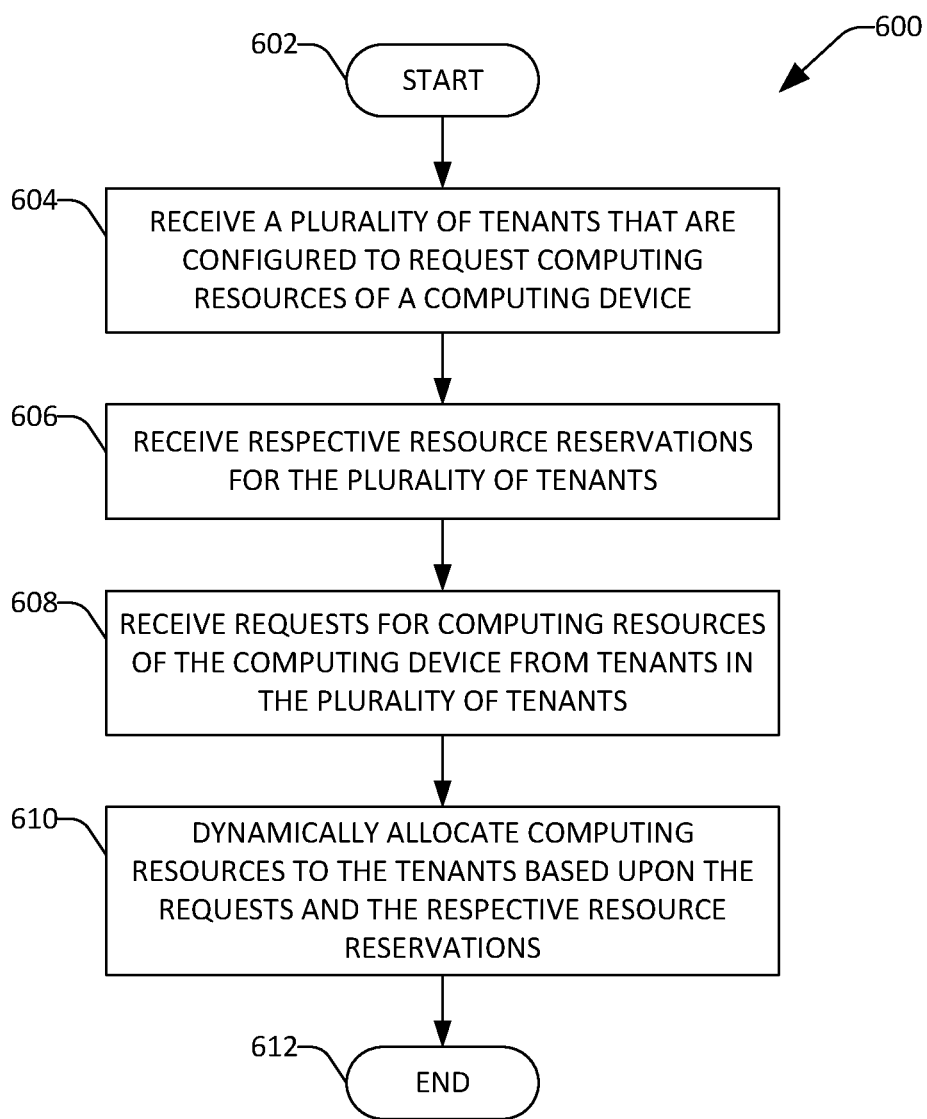
FIG. 6 is a flow diagram illustrating an exemplary methodology for dynamically allocating rate-based computing resources to tenants in a multi-tenant server computing device.
Figure 7:
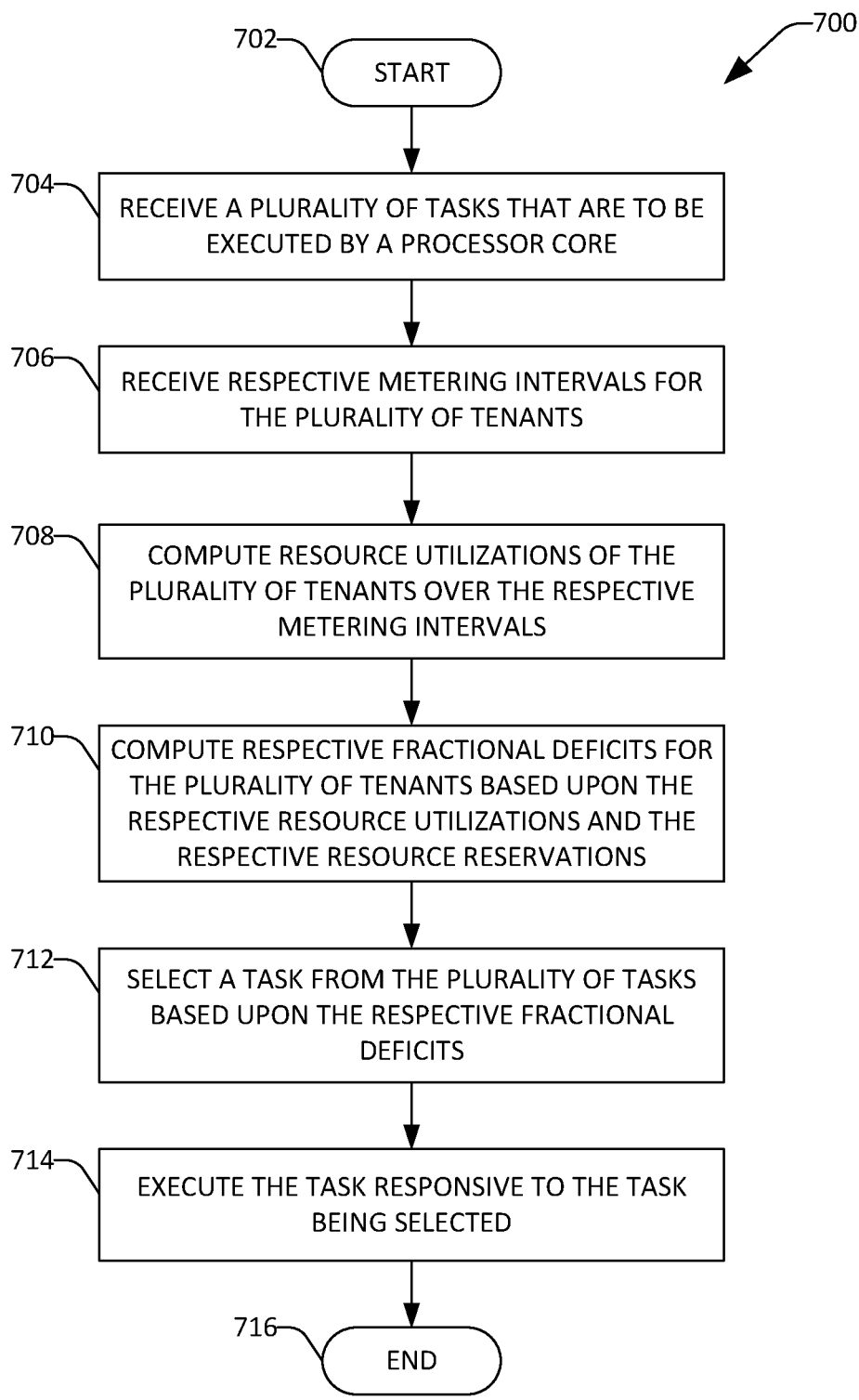
FIG. 7 is a flow diagram illustrating an exemplary methodology for selecting a task to execute in a multi-tenant environment.

FIGS. 6 and 7 illustrate exemplary methodologies relating to allocating rate-based computing resources among multiple tenants while considering absolute resource reservations of such tenants. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 6, an exemplary methodology 600 that facilitates dynamically allocating resources to tenants is illustrated. The methodology 600 starts at 602, and at 604 a plurality of tenants are received at a computing device that has a fixed amount of rate-based computing resources. The tenants are configured to request rate-based computing resources of the computing device. At 606, respective resource reservations for the plurality of tenants are received, wherein the resource reservations are absolute. Further, in an example, the resource reservations reserve rate-based computing resources that, cumulatively, may be greater than the fixed amount of rate-based computing resources of the computing device. As indicated above, a resource reservation defines an amount of rate-based computing resources that is to be accessible to a tenant when the tenant requests rate-based computing resources.

At 608, requests for rate-based computing resources of the computing device are received from tenants in the plurality of tenants. At 610, rate-based computing resources are dynamically allocated to the tenants based upon the requests and the respective resource reservations for the plurality of tenants. In an exemplary embodiment, the rate-based computing resources can be dynamically allocated through utilization of a runnable task queue, wherein a task in the task queue is assigned a value based upon the tenant that is requesting the task. The value has been referred to herein as a fractional deficit (e.g., See Eq. 3). At each metering interval, a task with the largest fractional deficit is selected from the runnable task queue. The methodology 600 completes at 612.

Now turning to FIG. 7, an exemplary methodology 700 for selecting a task to execute on a processor core is illustrated. The methodology 700 starts at 702, and at 704 a plurality of tasks that are to be executed by the processor core are received. The plurality of tasks are generated by a respective plurality of tenants, wherein each tenant in the plurality of tenants has a respective resource reservation. Resource reservations of the tenants include both static and elastic reservations. Static reservations refer to reservation of a constant amount of computing resources for each time interval, while elastic resource reservations refer to computing resources that are to be available several time intervals.

At 706, respective metering intervals for the plurality of tenants are received, wherein the metering intervals are time periods over which respective resource utilization of the plurality of tenants are computed. At 708, the respective resource utilizations of the plurality of tenants are computed, and at 710 respective fractional deficits for the plurality of tenants are computed based upon the respective resource utilizations and the respective resource reservations. At 712, a task from the plurality of tasks is selected based upon the respective fractional deficits. For instance, a task of a tenant having the largest fractional deficit from amongst the fractional deficits can be selected. At 714, the task is executed responsive to the task being selected. The methodology 700 completes at 716.

Figure 8:
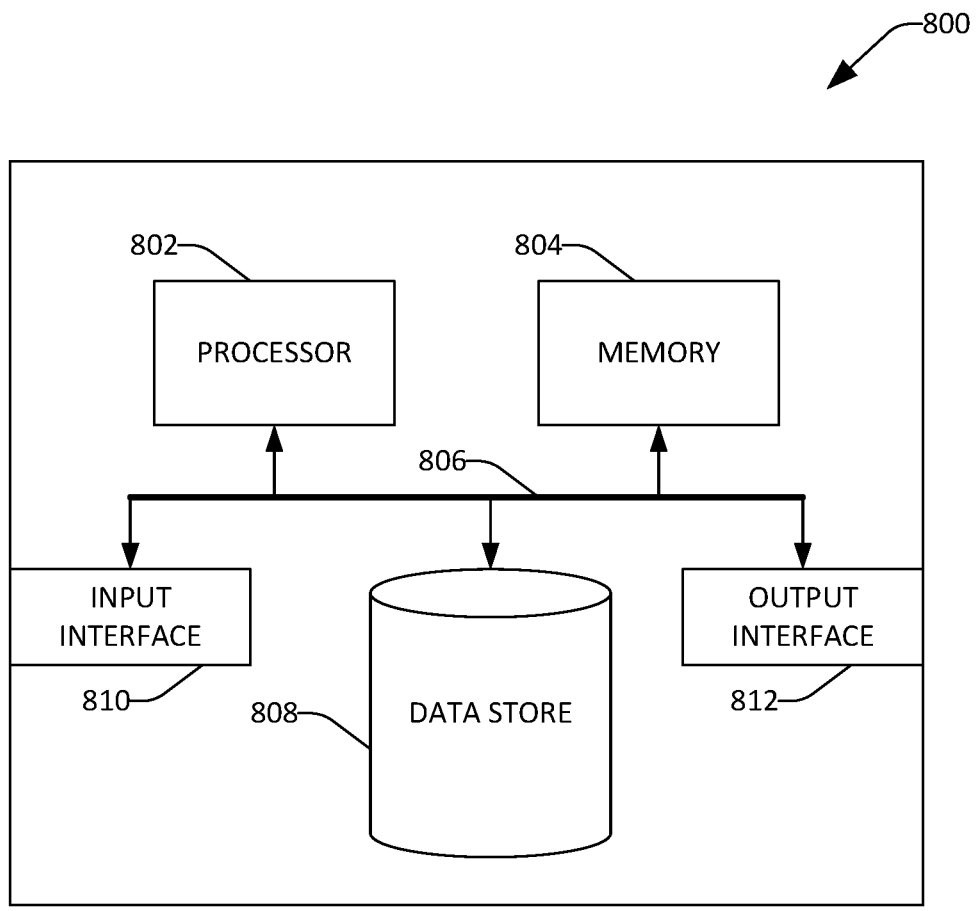
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that supports allocating rate-based computing resources among multiple tenants on a cloud server. By way of another example, the computing device 800 can be used in a system that supports cloud-based database operations. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store computing resource reservations for tenants, a list of tenants having runnable tasks, etc.

The computing device 800 additionally includes a data store 808 that is accessible by the processor 802 by way of the system bus 806. The data store 808 may include executable instructions, resource reservations, task queues, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising a processor and memory, wherein the memory stores instructions that, when executed by the processor, cause the processor to perform acts comprising:
   scheduling a task of a tenant of a cloud computing system to be completed by a computing device of the cloud computing system, wherein the task is scheduled to be completed based upon a reservation of the tenant for a rate-based computing resource, wherein the reservation is indicative of an amount of the rate-based computing resource that is to be allocated to the tenant over a window of time; and
   causing the computing device of the cloud computing system to perform the task of the tenant in accordance with the scheduling of the task of the tenant.

2. The computing system of claim 1, the acts further comprising:
   scheduling a second task of a second tenant of the cloud computing system to be completed by the computing device of the cloud computing system, wherein the second task is scheduled to be completed based upon a second reservation of the second tenant for the rate-based computing resource, wherein the second reservation is indicative of a second amount of the rate-based computing resource that is to be allocated to the second tenant over the window of time; and
   causing the computing device of the cloud computing system to perform the second task of the tenant in accordance with the scheduling of the second task of the tenant.

3. The computing system of claim 1, wherein the task of the tenant of the cloud computing system is scheduled to be completed based further upon a second reservation of the tenant for a second rate-based computing resource, wherein the second reservation is indicative of an amount of the second rate-based computing resource that is to be allocated to the tenant over the window of time.

4. The computing system of claim 1, the acts further comprising:
scheduling a second task of a second tenant of the cloud computing system to be completed by the computing device of the cloud computing system, wherein the second task is scheduled to be completed based upon a reservation of the second tenant for a second rate-based computing resource, wherein the reservation of the second tenant is indicative of an amount of the second rate-based computing resource that is to be allocated to the second tenant over the window of time; and
causing the computing device of the cloud computing system to perform the second task of the tenant in accordance with the scheduling of the second task of the tenant.

5. The computing system of claim 1, wherein the window of time is amongst several windows of time, and further wherein the reservation indicates that the tenant is to be allocated the amount of the rate-based computing resource for each window of time in the several windows of time.

6. The computing system of claim 1, wherein the task of the tenant is scheduled based further upon a second reservation for the rate-based computing resource for a second tenant of the cloud computing environment over the window of time.

7. The computing system of claim 1, wherein the rate-based computing resource is CPU time of the computing device.

8. The computing system of claim 1, wherein the computing system schedules tasks for tenants across several computing devices of the cloud computing environment based upon reservations of the tenants for the rate-based computing resource.

9. The computing system of claim 1, wherein the rate-based computing resource pertains to a number of I/O operations during the window of time.

10. The computing system of claim 1, wherein the rate-based computing resource is a number of processing cycles during the window of time.

11. A method performed by a computing system in a cloud computing environment that comprises several computing devices that are configured to execute tasks of tenants of the cloud computing environment, the method comprising:
scheduling a task of a tenant for execution on a computing device in the computing devices of the cloud computing environment, wherein a portion of the task is scheduled to be executed within a window of time, wherein the task is scheduled for execution based upon a reservation of the tenant for a rate-based computing resource of the computing device, wherein the reservation indicates an amount of the rate-based computing resource that is to be allocated to the tenant within the window of time; and
causing the computing device to execute the tenant in accordance with reservation of the tenant for the rate-based computing resource.

12. The method of claim 11, wherein the task of the tenant is scheduled based further upon a second reservation of a second tenant for the rate-based computing resource, wherein the second reservation indicates a second amount of the rate-based computing resource that is to be allocated to the tenant over the window of time.

13. The method of claim 11, wherein the resource reservation indicates an amount of a second rate-based computing resource that is to be allocated to the tenant over the window of time.

14. The method of claim 11, further comprising:
scheduling a second task of a second tenant for execution on the computing device, wherein a portion of the second task is scheduled to be executed within the window of time, wherein the second task is scheduled for execution based upon a second reservation of the second tenant for the rate-based computing resource of the computing device, wherein the second reservation indicates an amount of the rate-based computing resource that is to be allocated to the second tenant within the window of time; and
causing the computing device to execute the second tenant in accordance with the second reservation of the second tenant for the rate-based computing resource.

15. The method of claim 11, wherein the window of time is amongst several windows of time, wherein each window of time in the several windows of time is of the same length, and further wherein the reservation indicates that the tenant is to be allocated the amount of the rate-based computing resource during each window of time in the several windows of time.

16. The method of claim 11, wherein the rate-based computing resource is CPU time of the computing device.

17. A client computing device comprising a processor and memory, wherein the memory stores instructions that, when executed by the processor, cause the processor to perform acts comprising:
causing a tenant to be instantiated on at least one computing device in a cloud computing system, wherein the cloud computing system schedules a task set forth by the tenant to be computed by the at least one computing device, wherein the task is scheduled to be completed based upon a reservation of the tenant for a rate-based computing resource, wherein the reservation is indicative of an amount of the rate-based computing resource that is to be allocated to the tenant over a window of time, and further wherein the task is performed by the at least one computing device in accordance with the scheduling of the task of the tenant.

18. The client computing device of claim 17, wherein the task of the tenant of is scheduled to be completed based further upon a second reservation of the tenant for a second rate-based computing resource, wherein the second reservation is indicative of an amount of the second rate-based computing resource that is to be allocated to the tenant over the window of time.

19. The client computing device of claim 17, wherein the window of time is amongst several windows of time, and further wherein the reservation indicates that the tenant is to be allocated the amount of the rate-based computing resource for each window of time in the several windows of time.

20. The client computing device of claim 17, wherein the task of the tenant is scheduled based further upon a second reservation for the rate-based computing resource for a second tenant of the cloud computing environment over the window of time.

* * * * *